US012585826B2

(12) United States Patent
Patel

(10) Patent No.: US 12,585,826 B2
(45) Date of Patent: Mar. 24, 2026

(54) DOCUMENT AUTHENTICATION USING ELECTROMAGNETIC SOURCES AND SENSORS

(71) Applicant: Jumio Corporation, Palo Alto, CA (US)

(72) Inventor: Labhesh Patel, Santa Clara, CA (US)

(73) Assignee: Jumio Corporation, Sunnyvale, CA (US)

( * ) Notice: Subject to any disclaimer, the term of this patent is extended or adjusted under 35 U.S.C. 154(b) by 403 days.

(21) Appl. No.: 18/148,379

(22) Filed: Dec. 29, 2022

(65) Prior Publication Data

US 2023/0135953 A1 May 4, 2023

Related U.S. Application Data

(63) Continuation of application No. PCT/US2021/033688, filed on May 21, 2021.

(60) Provisional application No. 63/051,324, filed on Jul. 13, 2020.

(51) Int. Cl.
*G06F 21/64* (2013.01)
*G06V 30/14* (2022.01)
*G06V 30/41* (2022.01)

(52) U.S. Cl.
CPC .......... *G06F 21/64* (2013.01); *G06V 30/1448* (2022.01); *G06V 30/41* (2022.01)

(58) Field of Classification Search
CPC .... G06F 21/64; G06V 30/1448; G06V 30/41; G06V 30/40
See application file for complete search history.

(56) References Cited

U.S. PATENT DOCUMENTS

2011/0140857 A1* 6/2011 Hull ................... G06K 7/10356
340/10.1
2019/0311472 A1* 10/2019 Harrup ............... G06K 19/0614

FOREIGN PATENT DOCUMENTS

EP 3 382 660 A1 10/2018

OTHER PUBLICATIONS

International Search Report, Written Opinion, dated Sep. 8, 2021, International Application No. PCT/US2021/033688, 12 pages.

* cited by examiner

*Primary Examiner* — Akwasi M Sarpong
*Assistant Examiner* — Michael L Burleson
(74) *Attorney, Agent, or Firm* — Patent Law Works LLP

(57) ABSTRACT

Systems and methods for authenticating a document are provided. The methods include receiving image data that includes a document and data from one or more sensors. The methods include determining a location of the document using the image data and the data received from the sensors. The methods further include determining electromagnetic signal parameters using the determined location of the document and emitting an electromagnetic signal at the document. The electromagnetic signal is based on the determined electromagnetic signal parameters. The methods include, while emitting the electromagnetic signal at the document, capturing a verification image of the document. The verification image includes security features that are exposed to the electromagnetic signal. The methods further include determining whether a security feature of the verification image meets security criteria and in accordance with a determination that the security feature of the verification image meets the security criteria, providing authentication information.

20 Claims, 19 Drawing Sheets

$t=t_0, d=d_0$ $t=t_1, d=d_1$ t=t₀ t=t₁ t=t₀ t=t₁

600

Adjust the document in shown in the area

904

902

608

300

302

312

$t=t_0$

600

952

300

302

308

608

312

306

314

$t=t_1$ $t=t_0$ $t=t_1$ $t=t_0, d=d_0$ $t=t_1, d=d_1$

1400

1500

---

1502
Receiving image data that includes a document

↓

1504
Receiving data from one or more sensors

1506
The one or more sensors include a depth sensor that determines a distance between the depth sensor and the document, the distance between the depth sensor and the document included in the data received from the one or more sensors

↓

1508
Determining a first location of the document using the data received from the one or more sensors and the received image data

1510-a
Determining the first location of the document includes capturing one or more location determination images of the document;
1510-b
Determining a respective position of the document in the one or more location determination images; and
1510-c
Based on the respective position of the document in the one or more location determination images, determining the first location of the document

↓

1512
Determining first electromagnetic signal parameters using at least the determined first location of the document

1514-a
Receiving device information corresponding to an electronic device associated with the system, wherein the device information includes a bend radius that corresponds a configuration of the electronic device relative to the determined first location of the document; and
1514-b
Determining the first electromagnetic signal parameters includes using the received device information

↓

Figure 15A

1516-a
Determining whether the determined first location of the document meets capture criteria; and
1516-b
In accordance with a determination that the determined first location of the document does not meet the capture criteria, prompting a user to adjust the document

1518
Emitting, using one or more electromagnetic signal emitters, a first electromagnetic signal at the document, wherein the first electromagnetic signal is based on the determined first electromagnetic signal parameters

1520
While emitting the first electromagnetic signal at the document, capturing, via one or more cameras, a first verification image of the document, wherein the first verification image includes security features that are exposed to the first electromagnetic signal

1522
Determining whether a first security feature of the security features in the first verification image meets security criteria

1524
The security criteria includes comparing at least one of characteristics or patterns of the first security feature with characteristics or patterns of a respective stored security feature

1526
In accordance with a determination that the first security feature of the security features meets the security criteria, providing authentication information.

---
1528
In accordance with a determination that the first security feature of the security features does not meet the security criteria, providing invalidation information
---

---
1530-a
after capturing the first verification image of the document, determining a second location of the document;
1530-b
determining second electromagnetic signal parameters using at least the determined second location of the document;
1530-c
emitting a second electromagnetic signal at the document, wherein the second electromagnetic signal is based on the determined second electromagnetic signal parameters;
1530-d
while emitting the second electromagnetic signal at the document, capturing a second verification image of the document, wherein the second verification image includes additional security features that are exposed to the second electromagnetic signal;
1530-e
determining whether a second security feature of the additional security features in the second verification image meets security criteria; and
1530-f
in accordance with a determination that the second security feature of the additional security features meets the security criteria, providing authentication information ---
1532
The determined first location and the determined second location of the document are the same and the determined second electromagnetic signal parameters are distinct from the first electromagnetic signal parameters
---

---
1534
The determined second location of the document is distinct from the determined first location of the document
---
---

1530 (cont.)

1536
The first security feature and the second security feature are the same

1538
The security criteria includes comparing at least one of characteristics or patterns of the first security feature with characteristics or patterns of the second security feature.

1540
The first verification image is captured by a first camera and the second verification image is captured by a second camera that is distinct from the first camera

1542
The first electromagnetic signal is a first displayed image and the second electromagnetic signal is a second displayed image that is distinct from the first displayed image

1544
The first displayed image includes a first pattern configured to expose a first security feature from a first angle and the second displayed image includes a second pattern configured to expose the first security feature from a second angle

1546
The first electromagnetic signal is a first flash with first flash characteristics and the second electromagnetic signal is a second flash with second flash characteristics that are distinct from the first flash characteristic

1548
The first electromagnetic signal is a first set of one or more lasers with a first laser characteristic and the second electromagnetic signal is a second set of one or more lasers with a second laser characteristic that is distinct from the first laser characteristic

1530 (cont.)

1550
The first electromagnetic signal is emitted using a first electromagnetic signal emitter and the second electromagnetic signal is emitted using a second electromagnetic signal emitter that is distinct from the first electromagnetic signal emitter 1552
The first electromagnetic signal emitter is a first display and the second electromagnetic signal emitter is a second display that is distinct from the first display 1554
The first electromagnetic signal emitter has a first signal source type and the second electromagnetic signal emitter has a second signal source type that is distinct from the first signal source type

Figure 15E

DOCUMENT AUTHENTICATION USING ELECTROMAGNETIC SOURCES AND SENSORS

PRIORITY APPLICATIONS

This application is a continuation of PCT Application PCT/US2021/033688, filed May 21, 2021, which claims priority to U.S. Prov. App. No. 63/051,324, filed Jul. 13, 2020, each of which is hereby incorporated by reference in its entirety.

TECHNICAL FIELD

This application relates generally to document authentication, and more particularly, to using electromagnetic signals for document authentication.

BACKGROUND

Document authentication is often performed to determine the validity of a document and/or verify the identity of an individual. Typically, document authentication involves comparing security features of a document, such as text, images, markings, and/or other indicia, with the standard security features of an authentic document. Systems that perform document authentication store security features in a data storage device and use those features to authenticate future documents.

SUMMARY

Document authentication systems described herein include systems that perform authentication using a document (e.g., a passport or driver's license) including a security feature (e.g., a hologram, perforations, impressions and/or embossing, etc.) that is illuminated and/or made visible by electromagnetic signals emitted by a device. For example, the electromagnetic signal emitted by the device is a light (e.g., flashlight or camera flash) emitted by a portable electronic device (e.g., a smartphone). A location of the document is determined and used to adjust an electromagnetic signal parameter. For example, the depth of the document in relation to the device, the position of the document within a capture frame, the orientation of the document, and/or other examples described herein are used to adjust electromagnetic signal parameters such as intensity, type of signal, signal frequency, signal patterns, etc. While the electromagnetic signals are emitted, an image of the document is captured. The verification image is analyzed (e.g., to determine whether the security feature is sufficiently illuminated to meet security criteria). An authentication determination is made on the basis of whether the illuminated and/or visible (e.g. detectable) security feature of the document meets the security criteria.

In some embodiments, a method is performed by a system including one or more processors and memory storing one or more programs for execution by the one or more processors. The method includes receiving image data that includes a document and receiving data from one or more sensors. The method further includes determining a first location of the document using the data received from the one or more sensors and the received image data, determining first electromagnetic signal parameters using at least the determined first location of the document, and emitting, using one or more electromagnetic signal emitters, a first electromagnetic signal at the document. The first electromagnetic signal is based on the determined first electromagnetic signal parameters. The method includes, while emitting the first electromagnetic signal at the document, capturing, via one or more cameras, a first verification image of the document. The first verification image includes security features that are exposed to the first electromagnetic signal. The method further includes determining whether a first security feature of the security features in the first verification image meets security criteria and, in accordance with a determination that the first security feature of the security features meets the security criteria, providing authentication information.

In accordance with some embodiments, an electronic device (e.g., a server system and/or a client device) includes one or more processors and memory storing one or more programs configured to be executed by the one or more processors. The one or more programs include instructions for performing the operations of one or more of the methods described above. In accordance with some embodiments, a non-transitory computer-readable storage medium has stored therein instructions that, when executed by an electronic device, cause the server system to perform the operations of one or more of the methods described above.

Detecting or capturing security features in a captured image of a document to determine whether a security feature of the document exposed to electromagnetic signal meets security criteria enables users to conveniently and efficiently authenticate documents. Tools and capabilities of user devices, such as electromagnetic signal emitters, improve the accuracy of document authentication by utilizing different variations in electromagnetic signals to verify security features as well as reduce the risk of identity theft and/or unauthorized transactions by providing a secure identification verification technique. Specifically, adjusting the emission of electromagnetic signals to authenticate a document reduces the extent to which user input data is required by increasing the information captured in an image (e.g., by making security features detectable under specific scenarios), thereby reducing the total number of images that a user has to provide, reducing the number of images that need to be processed, and expanding the functionality of the devices by using existing tools to improve security.

BRIEF DESCRIPTION OF THE DRAWINGS

So that the present disclosure can be understood in greater detail, features of various embodiments are illustrated in the figures of the accompanying drawings. The accompanying drawings, however, merely illustrate pertinent features of the present disclosure and are therefore not limiting.

FIGS. 15A-15E are flow diagrams illustrating a method for authenticating a document by analyzing a verification image to determine whether a security feature illuminated by an electromagnetic signal meets security criteria, in accordance with some embodiments.

In accordance with common practice, some of the drawings may not depict all of the components of a given system, method, or device. Finally, like reference numerals denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Figure 1:
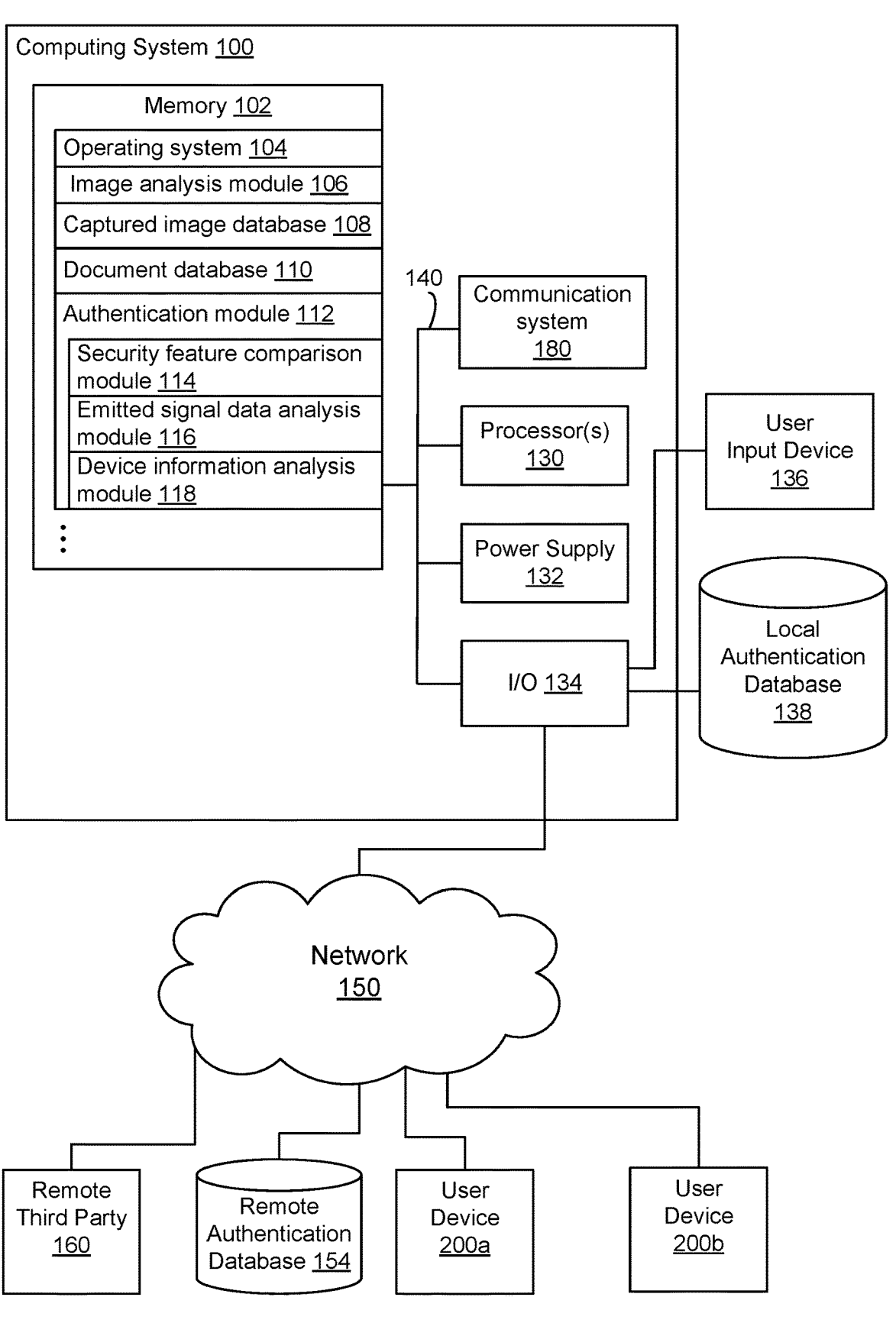
FIG. 1 is a diagram of a computing system and its context, in accordance with some embodiments.

FIG. 1 is a diagram of a computing system 100 in accordance with some embodiments. The computing system 100 is, for example, a server computer, a desktop computer, or a laptop computer. The computing system 100 typically includes a memory 102, one or more processor(s) 130, a power supply 132, an input/output (I/O) subsystem 134, and a communication bus 140 for interconnecting these components.

The processor(s) 130 execute modules, programs, and/or instructions stored in the memory 102 and thereby perform processing operations.

In some embodiments, the memory 102 stores one or more programs (e.g., sets of instructions) and/or data structures, collectively referred to as "modules" herein. In some embodiments, the memory 102, or the non-transitory computer readable storage medium of the memory 102 stores the following programs, modules, and data structures, or a subset or superset thereof:

an operating system 104 that includes procedures for handling various basic system services and for performing hardware-dependent tasks;

an image analysis module 106 for processing (e.g., determining initial document information such as location, orientation, visibility, etc.) video and/or images received from a user device 200, third party 160, or a user input device 136;

a captured image database 108 for storing received images or video from a user device 200, third party 160, or a user input device 136. The captured image database 108 also stores processed images with one or more security features detected or captured in the images or video;

a document database 110 for storing information indicating document types (e.g. information indicating that a document is an identification card, a passport, a driver's license, etc.), security features associated with a respective document type (as described further with regard to FIG. 3), indicating dimensions, material and/or configuration of a respective document type; and an authentication module 112 for processing captured images, storing authentication information associated with the captured images, and/or transmitting authentication information. The document authentication module 236 may include the following modules (or sets of instructions), or a subset or superset thereof:

a security feature comparison module 114 for processing (e.g., comparing, matching, or analyzing) received captured image data and determining whether one or more security features of a document in a captured image meet security criteria (e.g., from stored security features in document database 110 or additional captured images);

an emitted signal data analysis module 116 for processing emitted signal data received from a user device 200, remote third party 160, and/or user input device 136 in conjunction with the security feature comparison module 114 to determining whether one or more security features of a document in a captured image meet security criteria; and a device information analysis module 118 for processing received device information from a user device 200, remote third party 160, and/or user input device 136 in conjunction with the security feature comparison module 114 to determine whether one or more security features of a document in a captured image meet security criteria.

The above-identified modules (e.g., data structures, and/or programs including sets of instructions) need not be implemented as separate software programs, procedures, or modules, and thus various subsets of these modules may be combined or otherwise re-arranged in various embodiments. In some embodiments, the memory 102 stores a subset of the modules identified above. In some embodiments, a remote authentication database 154 and/or a local authentication database 138 store one or more modules identified above. Furthermore, the memory 102 may store additional modules not described above. In some embodiments, the modules stored in the memory 102, or a non-transitory computer readable storage medium of the memory 102, provide instructions for implementing respective operations in the methods described below. In some embodiments, some or all of these modules may be implemented with specialized hardware circuits that subsume part or all of the module functionality. One or more of the above-identified elements may be executed by one or more of the processor(s) 130. In some embodiments, one or more of the modules described with regard to the memory 102 are implemented in the memory 202 of a user device 200 (FIG. 2) and executed by the processor(s) 224 of the user device 200.

In some embodiments, the I/O subsystem 134 communicatively couples the computing system 100 to one or more local devices, such as a sensing input device 136 and/or a local authentication database 138, via a wired and/or wireless connection. In some embodiments, the I/O subsystem 134 communicatively couples the computing system 100 to one or more remote devices, such as a remote authentication database 154, a remote third party 160 (e.g., a party requesting authentication of a user), a first user device 200a, and/or a second user device 200b (e.g., via communications network 150). In some embodiments, the communications network 150 is the Internet. In some embodiments, the communication network 150 is a privately secured network and/or a public network.

In some embodiments, a sensing input device 136 (e.g., one or more cameras, one or more electromagnetic signal emitters, and/or one or more sensors) is communicatively coupled to the computing system 100 (e.g., via a wired and/or wireless connection). For example, the computing system 100 is located in or near to an authentication kiosk, or is communicatively coupled to an authentication kiosk that includes the sensing input device 136.

The communication bus 140 optionally includes circuitry (sometimes called a chipset) that interconnects and controls communications between system components.

Figure 2:
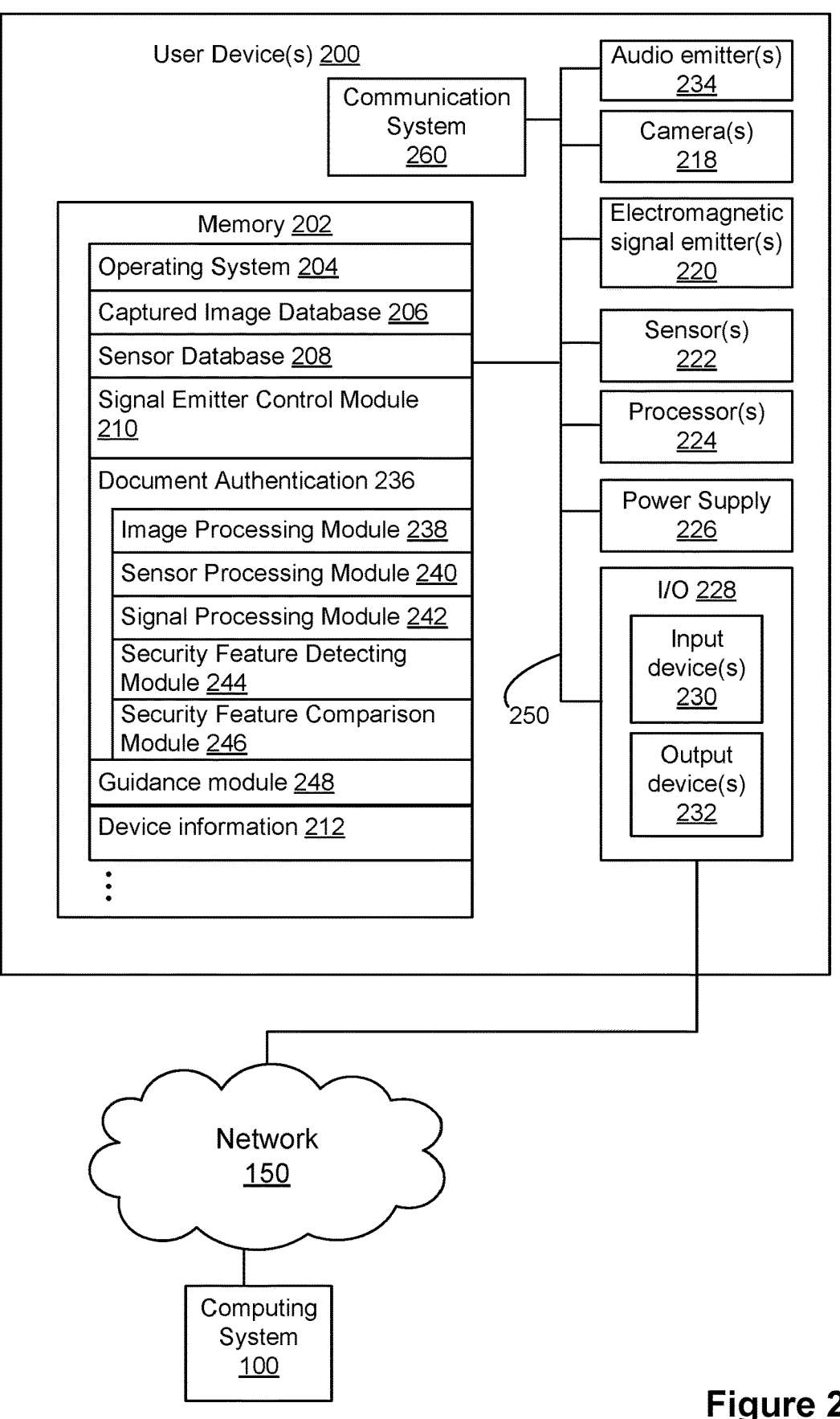
FIG. 2 is a diagram of a sensing device, in accordance with some embodiments.

FIG. 2 is a diagram of a user device 200 (e.g., the first or second sensing devices 200a or 200b) in accordance with some embodiments. The user device 200 typically includes a memory 202, one or more cameras 218, one or more electromagnetic signal emitter(s) 220 (e.g., a light source, such as a flashlight), one or more sensor(s) 222, one or more processor(s) 224, a power supply 226, an input/output (I/O) subsystem 228, and a communication bus 250 for interconnecting these components. In some embodiments, user device 200 includes one or more audio signal emitter(s) 234 (e.g., a speaker). The user device 200 is, for example, a mobile phone, a tablet, a digital camera, a laptop computer or other computing device, or a kiosk.

The processor(s) 224 execute modules, programs, and/or instructions stored in the memory 202 and thereby perform processing operations.

In some embodiments, the memory 202 stores one or more programs (e.g., sets of instructions) and/or data structures, collectively referred to as "modules" herein. In some embodiments, the memory 202, or the non-transitory computer readable storage medium of the memory 202 stores the following programs, modules, and data structures, or a subset or superset thereof:

an operating system 204 that includes procedures for handling various basic system services and for performing hardware-dependent tasks;

a captured image database 206 for receiving and/or storing image data (e.g., video and/or still images) captured by one or more the camera(s) 218;

a sensor database 208 for receiving and/or storing data provided by sensors 222 and/or sensor processing module 240;

a signal emitter control module 210 for providing one or more electromagnetic signal parameters to the electromagnetic signal emitters (220) and causing the electromagnetic signal emitters (220) to emit one or more the electromagnetic signals;

a document authentication module 236 for processing (e.g. authenticating) captured images, storing authentication information associated with the captured images, and/or transmitting (e.g., to computing system 100) authentication information. The document authentication module 236 may include the following modules (or sets of instructions), or a subset or superset thereof:

an image processing module 238 for processing (e.g., determining initial document information such as location, orientation, visibility, etc.) video and/or images captured via camera 214;

a sensor processing module 240 for processing (e.g., analyzing) received and/or stored sensor data provided by sensors 222 and/or sensor database 208;

a signal processing module 242 for determining signal parameters (electromagnetic and/or audio) based on data received from the sensor processing module 242, determining which emitters (electromagnetic 220 and/or audio 234) to activate and/or signal parameters, and determining and/or and providing the signal parameters and/or the selected emitters to the signal emitter control module 210;

a security feature detecting module 244 for determining and/or identifying one or more security features of a document in the video and/or images captured by camera 218; and a security feature comparison module 246 for processing (e.g., comparing, matching, or analyzing) captured image data and emitted electromagnetic signals to determine whether one or more security features of a document in a captured image meet security criteria (e.g., from stored security features in document database 110, locally stored security features, and/or additional captured images);

a guidance module 248 for providing one or more directions or instructions to a user for adjusting and/or positioning the document and/or user device to capture an image; and device information 212 for receiving and storing information corresponding to the configuration of the device.

The above-identified modules (e.g., data structures, and/or programs including sets of instructions) need not be implemented as separate software programs, procedures, or modules, and thus various subsets of these modules may be combined or otherwise re-arranged in various embodiments. In some embodiments, the memory 202 stores a subset of the modules identified above. Furthermore, the memory 202 may store additional modules not described above. In some embodiments, the modules stored in the memory 202, or a non-transitory computer readable storage medium of the memory 202, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 224. In some embodiments, one or more of the modules described with regard to the memory 202 are implemented in the memory 102 of the computing system 100 and executed by processor(s) 130 of the computing system 100 (e.g., document authentication module 236]).

The one or more cameras 218 capture still images, sequences of images, and/or video. In some embodiments, a camera 218 is a digital camera that includes an image sensor and one or more optical devices. The image sensor is, for example, a charge-coupled device or other pixel sensor that detects light. In some embodiments, one or more optical devices are movable relative to the image sensor by an imaging device actuator. The one or more optical devices affect the focus of light that arrives at the image sensor and/or an image zoom property. In some embodiments, the one or more cameras include a front facing ("selfie camera"), a rear facing camera, a wide or ultra-wide angle camera, a telephoto camera, a hyperspectral camera and/or a depth-camera. In some embodiments, multiple images and/or images from multiple image sensors are combined into a single enhanced image, such as an HDR and/or hyperspectral image. In some embodiments, the user device 200 includes one or more cameras 218 (e.g., the one or more cameras 218 are located within a housing of the user device 200). In some embodiments, the one or more cameras 218 are peripheral devices that capture images and sends captured image data 206 to the I/O subsystem 228 of the user device 200 via a wired and/or wireless communication connection.

The electromagnetic signal emitters 220 emit one or more electromagnetic signals. In some embodiments, the electromagnetic signal emitters 220 include one or more displays, flashlights, flashes, strobes, lasers, light-emitting diodes (LED) s, infrared light, ultraviolet light, light engines, projectors, autofocus lasers, and/or other various types of electromagnetic signal emitters. In some embodiments, the emitted signals of the electromagnetic signal emitters 220 are adjusted, based on the electromagnetic signal parameters, to vary the intensity, duration, direction, patterns, colors, signal type, number of signals, and/or timing (e.g. strobe timing). In some embodiments, the electromagnetic signal parameters include images displayed (e.g., via a display of user device 200) while one or more verification images are captured. For example, the electromagnetic signal parameters may include image identifying information, intensity, brightness, contrast, and/or color parameters (any of the available gain, gamma, etc.).

Additionally or alternatively, the electromagnetic signal parameters are used to determine the source of the emitted signals (e.g., the type electromagnetic signal emitters used). For example, in some embodiments, the one or more electromagnetic signal parameters include the type of the emitted signal, such as visible light (flash, strobe, laser, LED, a display that displays one or more images and/or video, etc.), ultraviolet light (e.g., UV detectors and/or UV lights used to illuminate an ultraviolet activateable security feature), infrared light, an autofocus signal (e.g., autofocus laser), and/or electromagnetic signals from a projector (e.g., a projector attachment for a portable device). In some embodiments, the electromagnetic signal emitters 220 are adjusted and/or selected by the signal emitter control module 210. In some embodiments, the electromagnetic signal parameters are determined, in part, based on the security feature that is to be detected. For example, the electromagnetic signal parameters may identify the type of electromagnetic signal emitter and/or the characteristics or patterns of the emitted electromagnetic signals based, in part, on the security features as described in FIG. 3. Adjustment and/or selection of the electromagnetic signal emitters 220 is based on the determined electromagnetic signal parameters as described below in FIGS. 6A-12C.

The sensors 222 determine information corresponding to the user device 200, the location of the document, and/or the capture environment. In some embodiments, the sensors 222 include position and/or motion sensors such as, accelerometers, magnetometers, gyro sensors, depth sensors, proximity sensors, light sensors, Red, Green, Blue (RGB) sensors (e.g., used to determine distances based on color gradations), global positioning system (GPS), and motion and/or position based sensors. The position and/or motion sensors are configured to capture information corresponding to the position and/or motion of the user (e.g. rotation of user's body, moving side to side, etc.), motion of the device, the position and/or motion of the user device (e.g., movement of the device relative to the user and/or document, device orientation, rotation of the device, positon of the device relative to the document, device angle, etc.), the position and/or motion of the document (e.g., distance from the document to the user device 200, tilting and/or shifting of the document, angled positioning of the document, rotation of the document, etc.), general geographic location of the device, and other positional information.

In some embodiments, the sensors 222 include light sensors such as pixel sensors, charge-coupled device, photoresistors, photodiodes, phototransistors, light dependent resistors, and/or other types of light sensors. In some embodiments, the light sensors are used to determine ambient light, reflected light, illumination, and other sources of light. In some embodiments, the light sensors are part of an image capturing device such as a camera 218.

In some embodiments, the sensors 222 include audio sensors such as microphones, audio indicators, and/or other types of audio sensors. In some embodiments, the audio sensors are used to determine the presence, location, orientation, movement, and/or other positional information of objects (e.g. documents) relative to the device and/or the device itself. For example, positional information of objects may be based on based on the origin of received audio, the time an emitted audio signal is reflected back, patterns in received audio, the volume of the sound, etc.

In some embodiments, the audio signal emitters 234 emit one or more audio signals. In some embodiments, the one or more audio signals emitted include audible sound, infrasonic, ultrasonic sound, and/or other audio signal types. In some embodiments, audio signal emitters 234 include one or more speakers and/or other sound producing devices. In some embodiments, the audio signal emitters 234 are adjusted to vary the intensity, duration, direction, patterns, and/or timing of their emitted signals. In some embodiments, the audio signal emitters 234 are adjusted and/or selected by the signal emitter control module 210. Adjustment and/or selection of the audio emitters 234 is based on the determined signal parameters as described below in FIGS. 6A-12C.

In some embodiments, the device information 212 includes the number of displays for the device; the characteristics of displays (e.g. type of display, size of the display, resolution of the display, flexible displays and/or display bend radius, etc.); device attachments with signal emitters (e.g. projectors, light emitting engines, smart covers, etc.); device attachments that change signal parameters of the available device signal emitters; device orientation; device shape; device type (e.g., clamshell, tablet, mobile device, flexible device etc.), etc. In some embodiments, the device information 212 includes information corresponding to the device sensors.

In some embodiments, the I/O subsystem 228 communicatively couples user device 200 to one or more remote devices, such as a computing system 100, via the communication network 150.

In some embodiments, a user input device 230 and/or an output device 232 are integrated with the user device 200 (e.g., as a touchscreen display). In some embodiments, a user input device 230 and/or an output device 232 are peripheral devices communicatively connected to user device 200. In some embodiments, a user input device 230 includes a microphone, a keyboard, and/or a pointer device such as a mouse, a touchpad, a touchscreen, and/or a stylus.

In some embodiments, the output device 232 includes a display (e.g., a touchscreen display that includes input device 230) and/or a speaker.

The communication bus 250 optionally includes circuitry (sometimes called a chipset) that interconnects and controls communications between system components.

In some embodiments, one or more user input devices and/or output devices (not shown), such as a display, touchscreen display, speaker, microphone, keypad, pointer control, zoom adjustment control, focus adjustment control, and/or exposure level adjustment control, are integrated with the user device 200.

Figure 3:
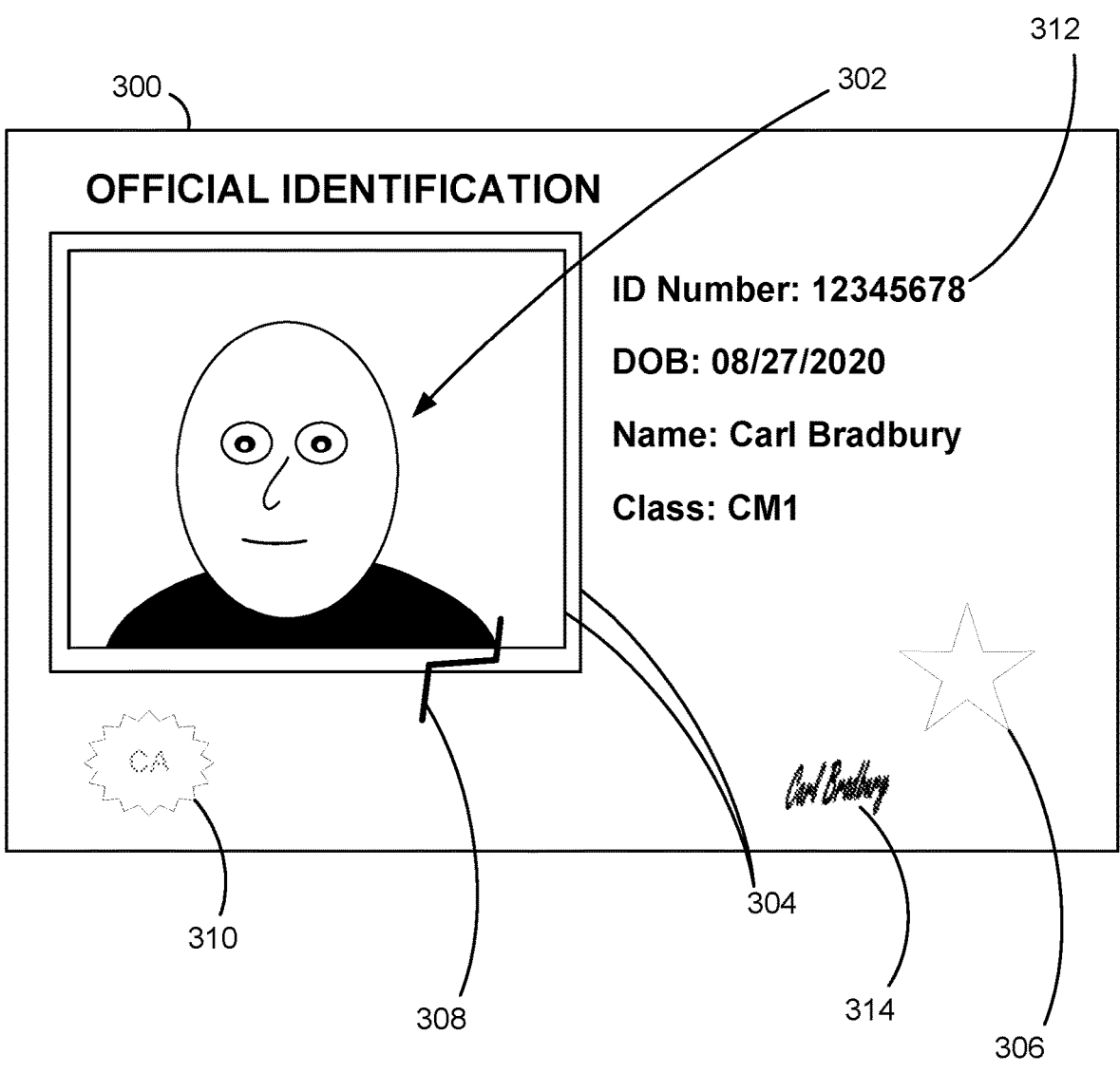
FIG. 3 illustrates various security features included in a document, in accordance with some embodiments.

FIG. 3 illustrates a document 300 that includes one or more security features, in accordance with some embodiments. Document 300 is, for example, an identification card, a driver's license, a passport, a payment card (e.g., credit card or debit card), a facility access card. In some embodiments, a security feature is semi-transparent and/or fully transparent. In some embodiments, a security feature has a defined glares and/or reflective property. For example, a security feature has a transient glow feature (e.g., features exposed under particular circumstances such as when hit by electromagnetic signals and/or moved), a glistening feature, and/or an ultraviolet-activateable feature (e.g., a feature that is activated when the security feature is exposed to ultraviolet light). Security features exposed to one or more electromagnetic signals, as used herein, refers to security features captured in document 300 as electromagnetic signals are emitted at document 300 (whether or not the security features are detected or visible).

In some embodiments, the security features includes a facial image 302, facial image location cue information 304, perforations and/or holes 306, scratches and/or wear and tear 308, a hologram and/or and ultraviolet-activateable image 310, text 312, and/or a tactile feature 314. In some implementations, the security features are located on any portion of the document 300. Alternatively or additionally, in some embodiments one or more security features have predetermined locations on document 300 based on the document type, document variation (e.g., differences between a driver's license for a minor and an adult), and/or origin. In some implementations, a security feature is a combination of two or more security features. For example, a facial image 302 may be a hologram 310, text 312 may include a tactile feature 314 (e.g., embossing or impression), etc. In some embodiments, security features are used individually or in combination to authentication of a document. Characteristic and/or patterns of the one or more security features are discussed below.

In some embodiments, facial image 302 includes predetermined dimensions and/or has a predetermined proportion with respect to the document (e.g., occupying a third, fourth, a fifth of the document). For example, the facial image 302 may include dimensions specific to the type of document (passports, driver's license, security cards, etc.) or place of origin (e.g. country, state, city, etc.). In some embodiments, facial image 302 is placed in one or more predetermined locations of the document. In some embodiments, facial image 302 includes features, such as glares or reflective properties, that are detectable or visible when the document is moved and/or exposed to electromagnetic signals. For example, the facial image may include transient glow or an overlaid pattern that is revealed when moved or exposed to electromagnetic signals. In some embodiments, facial image 302 includes identifying colors and/or color schemes such as a standard background color, a change in color contrast between the facial image and the background, etc.

In some embodiments, facial image location cue information 304 (e.g., the concentric rectangles indicated at) is a visual indication on the document 300 of a location of the facial image 302 within the document 300. For example, the concentric rectangles 304 that surround facial image 302 provide a cue to the location of the facial image 302 within the document 300. In some embodiments, facial image location cue information 304 includes one or more marks and/or pointers. For example, facial image location cue information 304 indicates a facial image area that is smaller than the full area of the document 300 and that includes the facial image 302, such as a perimeter that indicates boundaries of the facial image 302 or otherwise surrounds a facial image 302. In some embodiments, a facial image location cue is a background surrounding a facial image 302 (e.g., a background that has a predefined color and/or pattern). In some embodiments, a facial image location cue includes a material and/or texture of the facial image area of the document 300 that is different from a material and/or texture of the remainder of the document 300.

In some embodiments, perforations and/or holes 306 include intentional markings that invalidate or authenticate a document. For instance, perforations and/or holes 306 may include a predetermined shape, pattern, and/or predetermined dimensions. In some embodiments, perforations and/or holes 306 are designed to be hidden and/or concealed and include small sized patterns or shapes that are detectable and/or visible in response to one or more electromagnetic signals. For example, electromagnetic signals, such as light, passing through perforations and/or holes 306 illuminate or outline the shape, pattern, and/or dimensions of perforations and/or holes 306. Alternatively or additionally, in some embodiments, perforations and/or holes 306 generate one or more distinct shadows in response to the one or more electromagnetic signals and/or reflect the one or more electromagnetic signals in a distinct manner. Alternatively and/or additionally, perforations and/or holes 306 include hole punches (e.g., hole punches indicating that a document is invalid.

In some embodiments, scratches and/or wear and tear 308 include incidental and/or intentional markings. For example, scratches and/or wear and tear 308 can include markings originating from daily use and/or continuous use, unintentional damage (e.g. keys, bending, etc.), and/or abrasive contact (e.g. scratches from document falling on the floor) with document that may cause damage. Scratches and/or wear and tear include typical patterns generated by the incidental or intention markings. For example, scratches include typical widths and/or depths that become visible and/or detectable when exposed to electromagnetic signals. Similarly, wear and tear such as abrasions and/or damage from the document coming into contact with objects (e.g., keys), falling to the ground, stored in a wallet and/or purse, etc. are made visible and/or detectable when exposed to electromagnetic signals. Additionally or alternatively, in some embodiments, different electromagnetic signal parameters (e.g., higher intensities, high frequency, etc.) allow for the scratches and/or wear and tear 308 to be detected or captured. In some embodiments, scratches and/or wear and tear 308 are compared to previously captured document images to ensure consistency between authentications. Intentional scratches includes cuts (e.g., from scissors and/or knives) that were made to throw away a document and/or invalidate a document.

In some embodiments, holograms and/or ultraviolet images 310 include a predetermined shape and/or predetermined dimensions. In some embodiments, holograms and/or ultraviolet images 310 are hidden and/or concealed. Alternatively and/or additionally, holograms and/or ultraviolet images 310 are detectable and/or visible in response to one or more electromagnetic signals. For example, hologram 310 may not be visible under ambient lighting and the one/or more electromagnetic signals illuminate the hidden and/or concealed hologram 310. In some embodiments, holograms and/or ultraviolet images 310 change shape and/or color in response to one or more electromagnetic signals. In some embodiments, holograms and/or ultraviolet images 310 change shape and/or color in response to movement and/or position of the document. For example, a user may be requested to tilt, rotate, and/or bend document 300, the requested movement making hologram 310 visible (e.g., detectable by the one or more cameras 218). In some embodiments, movement and/or position of the document is used in conjunction with emission of the one or more electromagnetic signals to detect hologram 310. In some embodiments, holograms 310 have a predetermined location on document 300 that corresponds to the type of the document. For example, a driver's license may have a hologram located on the bottom left corner of the document and a passport may have a hologram located on the center of the document.

In some embodiments, text 312 includes identifying information about the owner and/or document, such as address, name, identification number, and/or other document information. In some embodiments, text 312 includes micro-printing. Micro-printing includes small print text detectable and/or visible via one or more electromagnetic signals, a magnifier, and/or other equipment. In some embodiments, micro-printing is disguised in a background pattern of the documentation. In some embodiments, text 312 reflects the one or more electromagnetic signals making the text visible and/or detectable. In some embodiments, the text 312 includes glares or reflective properties, such as a transient glow feature, a glistening feature, and/or ultraviolet activateable features that are illuminated when moved and/or exposed to electromagnetic signals. In some embodiments, text 312 has a predetermined location on document 300 that corresponds to the particular type of document, origin of the document, and/or variation of the document (e.g., documents for minors compared to document of adults).

In some embodiments, tactile features 314 include embossed and/or debossed (e.g., impressed) images and/or textual information. In some embodiments, the embossed (e.g. raised edges) images and/or textual information create distinct shadows and/or reflect the one or more electromagnetic signals in a distinct manner. In some embodiments, the debossed (e.g. stamped) images and/or textual information create distinct shadows and/or reflect the one or more electromagnetic signals in a distinct manner. Additionally or alternatively, in some embodiments, tactile features 314 include metallic insertions or portions of document 300. In some embodiments, metallic insertions or portions of document 300 are detected and analyzed to determine that the metallic insertions or portions of document 300 move relatively to the position of the document, reflect emitted electromagnetic signals, are detected and/or captured when exposed to electromagnetic signals, etc. Tactile features 314 can include glares or reflective properties, such as a transient glow feature, a glistening feature, an ultraviolet activateable features. In some embodiments, tactile features 314 has predetermined location on document 300, the predetermined location of tactile features 314 corresponding to the particular type of document.

In some embodiments, the patterns, characteristics, and/or the reactions of the security features in response to one or more electromagnetic signals emitted towards document 300 and/or movement of document 300 are stored in document database 110 or locally on a user device 200. In some embodiments, the stored patterns, characteristics, and/or the reactions of the security features further include material specific properties of document 300 such as new plastified paper material, new glossy documents, and reflective properties of new documents of specific known materials. The stored patterns, characteristics, and/or the reactions of the security features are used to authenticate a document as described below.

Figure 4:
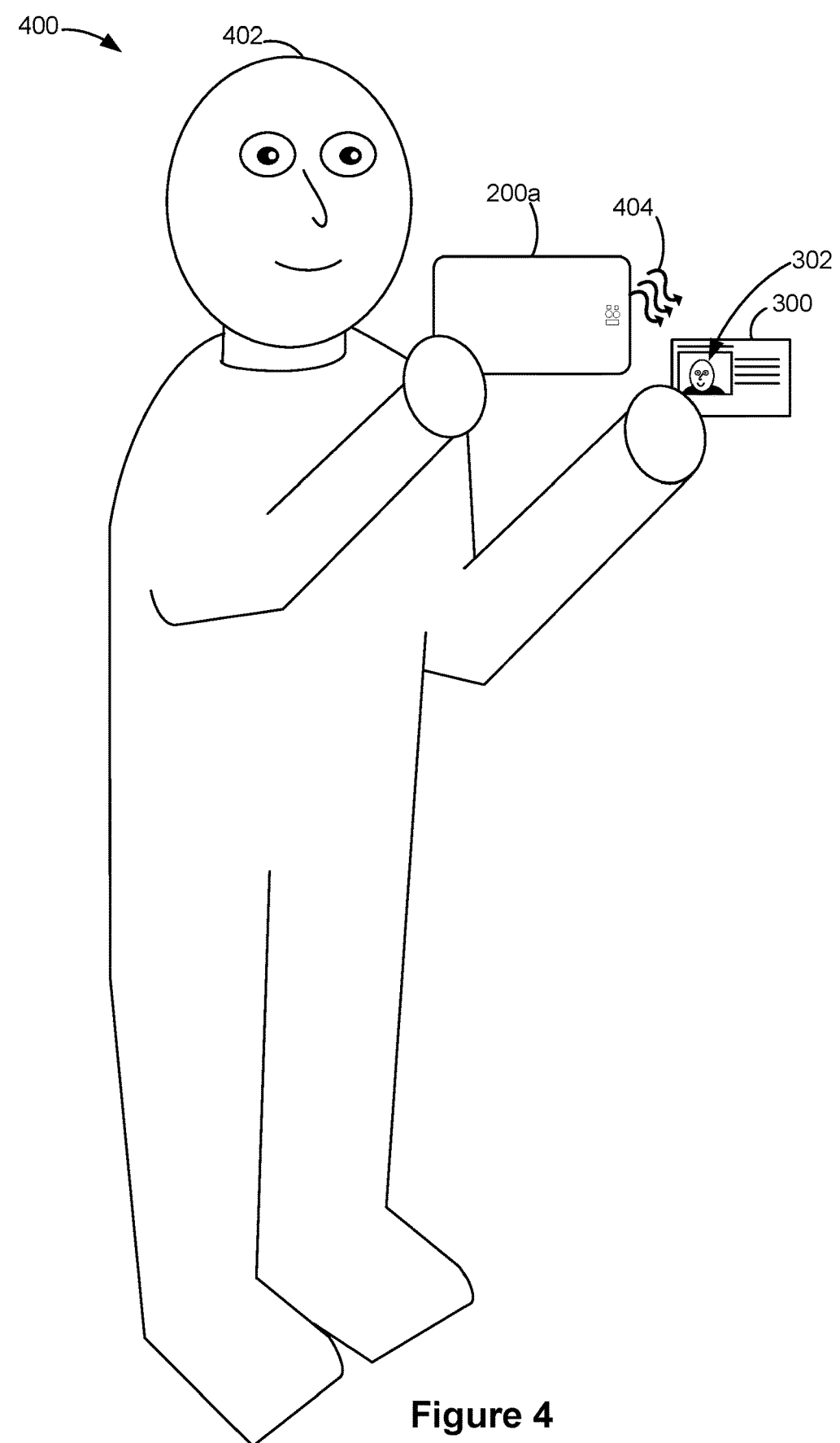
FIGS. 4 and 5 illustrate verification image capture environments, in accordance with some embodiments.

FIG. 4 illustrates an image capture environment 400 in accordance with some embodiments. In FIG. 4, a user 402 is presenting a document 300 (e.g., the user's driver's license) in one hand and a user device 200a (e.g., a mobile device) in the other hand. The document 300 includes one or more security features, for example facial image 302. The user device 200a is used to emit one or more electromagnetic signals 404 and to capture a verification image of the document 300 that includes one or more security features. In some embodiments, the one or more electromagnetic signals 404 are emitted via one or more electromagnetic emitter(s) 220 (e.g. flashlights, flashes, strobes, lasers, LEDs, displays, etc.). In some embodiments, the one or more cameras 218 are rear-facing cameras of the user device 200a, allowing the user 402 to adjust imaging properties of the one or more cameras 218 (e.g., a position and/or zoom level of the camera(s) 218) while viewing the output of the one or more cameras 218 on a display (e.g., an output device 232) of the user device 200a. Alternatively and/or additionally, in some embodiments, the one or more cameras 218 are front-facing cameras (e.g., "selfie" cameras) of the user device 200a, allowing the user 402 to adjust the distance between the user device 200 and the document and to further use the display of the sensing device as an emitter of the one or more electromagnetic signals 404. In some embodiments, the user 402 captures a verification image of document 300 on a surface (e.g. a table, desk, and/or other surface). In some embodiments, the user 402 can use any of the one or more cameras 218 of user device 200 (e.g. front facing ("selfie camera"), rear facing, wide angle, telephoto, hyperspectral and/or depth-camera and/or other types of cameras).

Figure 5:
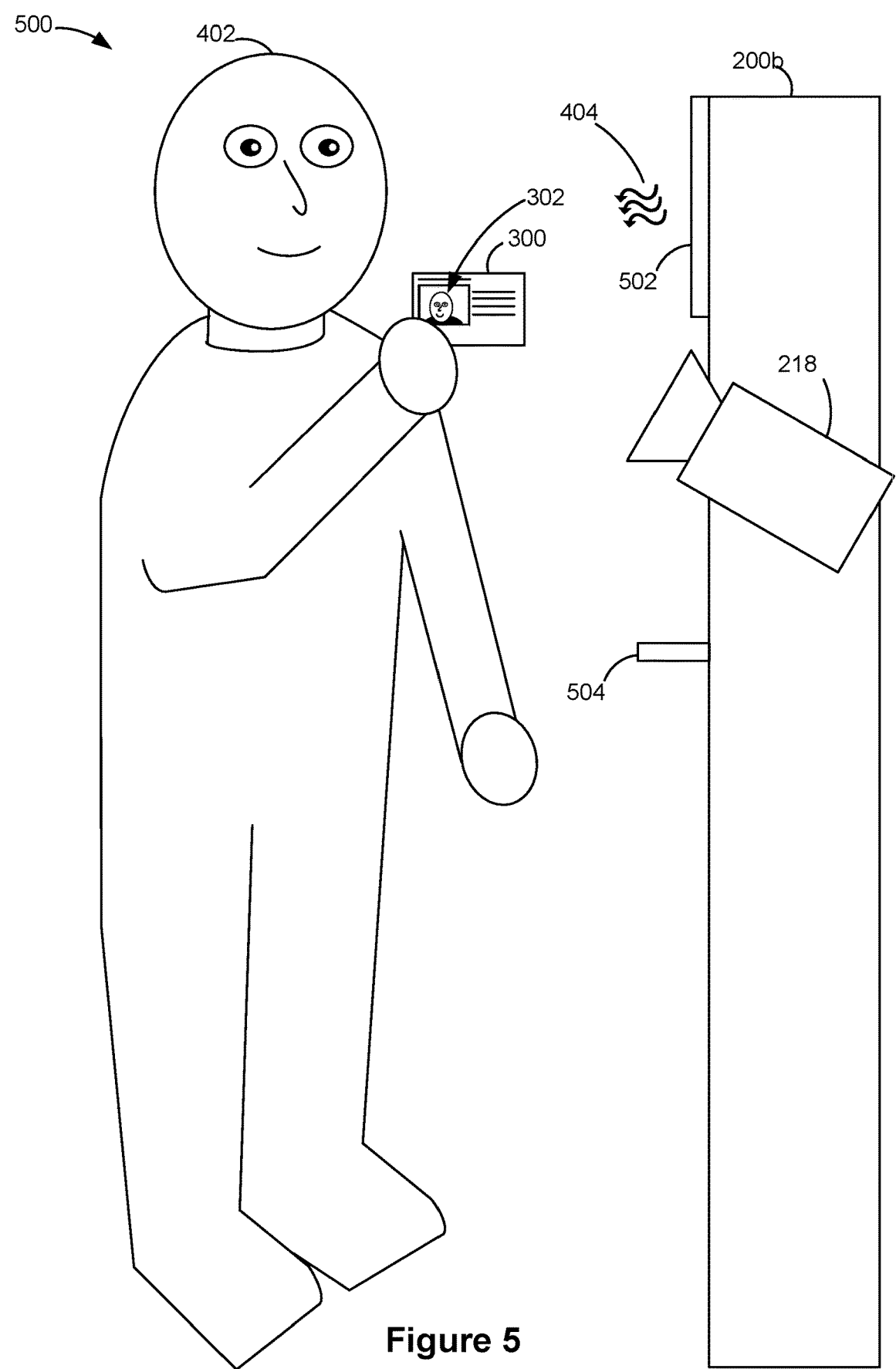

FIG. 5 illustrates an image capture environment 500 in accordance with some embodiments. In FIG. 5, the user device 200b is a kiosk (or a component of a kiosk). The kiosk 200b is, for example, a security kiosk (e.g., for gaining entrance to an entertainment venue, an office, and/or a travel destination) or a commercial kiosk (e.g., a registration and/or check-out device for a commercial establishment such as a store or hotel). The kiosk 200b includes one or more cameras 218 that capture a verification image of document 300 and, optionally, the face of the user 402 and one or more electromagnetic emitters 220 (e.g. flashlights, flashes, strobes, lasers, LEDs, displays, etc.) that emit one or more electromagnetic signals 404. The verification images include at least one security feature of document 300, such as facial image 302 detectable and/or visible in a captured image. In some embodiments, the kiosk 200b includes one or more user input devices 230 (e.g. kiosk controls 504) and/or output devices 232 (e.g. kiosk display 502).

Figure 6A:
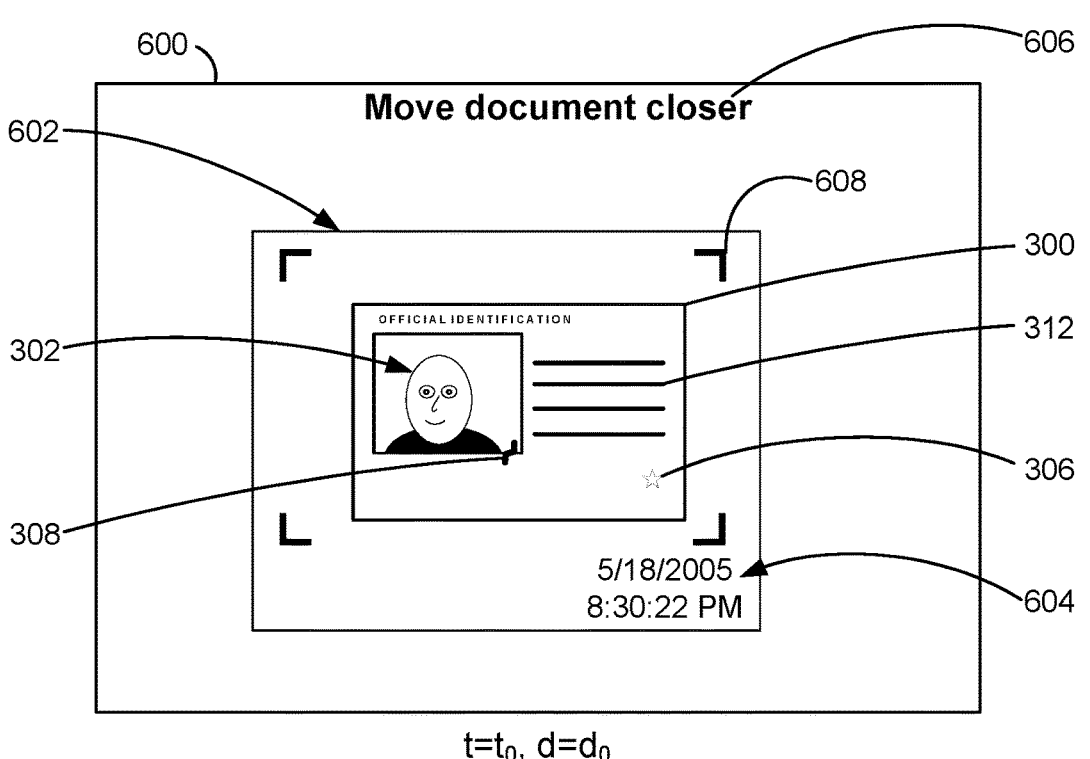
FIGS. 6A-6B illustrate adjustments to the position of a document while capturing verification images and emitting electromagnetic signals, in accordance with some embodiments.
Figure 6B:
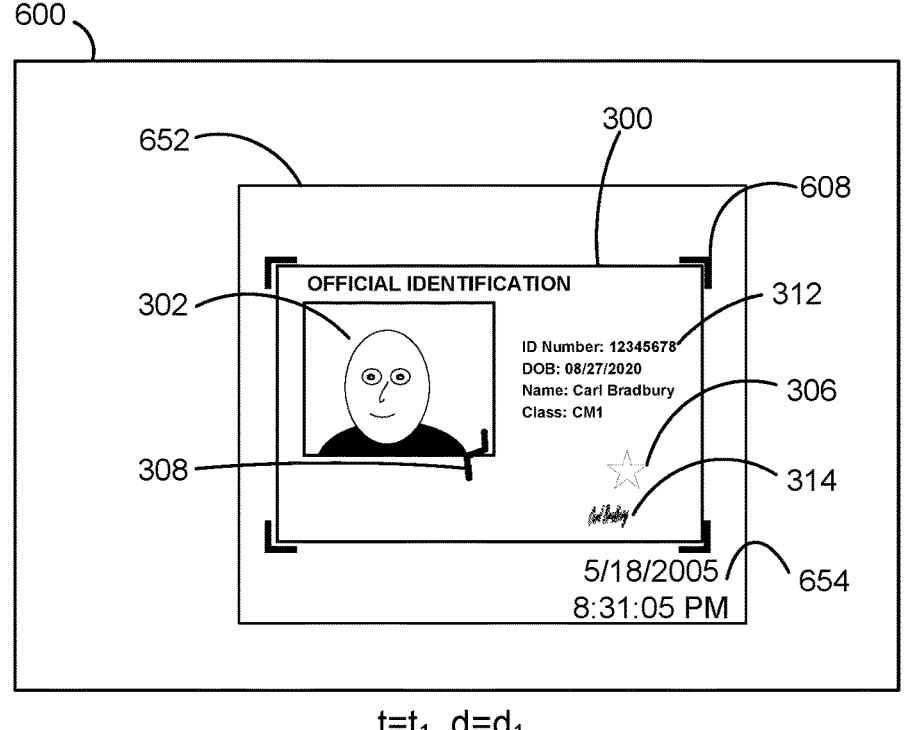

FIGS. 6A and 6B illustrate an exemplary capture by user device 200 and/or system 100 in accordance with some embodiments. In FIG. 6A, capture interface 600 includes first verification image 602. First verification image 602 is generated by user device 200 at a first time ($t_0$) and at a first location (e.g. $d_0$) of document 300. First verification image 602 includes an image of document 300 with one or more security features, such as facial image 302, perforations 306, scratch 308, text 312, etc. In some embodiments, the first verification image 602 further includes a time stamp 604, the time stamp corresponding to the first time ($t_0$). In some embodiments, the time stamp is used to authenticate document 300. In some embodiments, the first verification image 602 is an image frame from a video sequence, sequence of images, and/or a single still image.

In some embodiments, the location of document 300 is determined, via cameras 218, electromagnetic signal emitters 220, sensors 222, audio emitters 234, and/or device information 212. The location of the document 300 is used to determine signal parameters for emitting electromagnetic signals to detect and/or make visible the security features of document 300. In some embodiments, the location of document 300 is determined relative to user device 200. For example, in some embodiments, determining the location of document 300 includes determining a position of document 300 in space, and/or determining a distance between document 300 and user device 200. In some embodiments, determining the location of document 300 includes capturing, by the cameras 218, one or more location determination images, determining a position of document 300 in each of the one or more location determination images captured by the cameras 218, and determining the location of document 300 by comparing the change in the position of document 300 between the one or more location determining images (e.g., determining motion between frames). Additionally or alternatively, in some embodiments, the one or more location determination images are analyzed to determine if there are any irregularities in movement, spoofing attempts (e.g., disguising an invalid and/or false document as document 300), inconsistencies between frames, and/or any other non-compliant motion indicators.

In some embodiments, sensors 222 of user device 200 include a depth sensor. In some embodiments, determining the location of document 300 includes determining, via the depth sensor, a distance between the user device 200 (e.g., depth sensor) and the document 300. Alternatively and/or additionally, in some embodiments, user device 200 includes a depth camera, that includes stereo image capture and/or an illumination source and a light sensor, for example an infrared (IR) illuminator and/or an IR camera. In some embodiments, determining the location of document 300 includes determining, via the depth camera, a distance between user device 200 and document 300. Alternatively or additionally, in some embodiments, sensors 222 of the user device 200 includes motion and/or position sensors (e.g., described with reference to FIG. 2) and determining the location of document 300 includes determining the location and/or position of the user device 200 and/or document 300 relative to user device 200. For example, a GPS of the user device 200 tracks (e.g., continuously monitors and/or stores) the position of the user device 200 and a user may be asked to move the user device 200 and/or the document 300 a predetermined amount and/or to a predetermined location (e.g., directions "move document closer" 606 and showing predetermined location indicator 608). The position of the user device 200 in relation to the change in the position of document 300 between captured images and/or image frames is used to determine the location of document 300. The user may be asked to make movements such as rotate the user device 200, move the user device 200 closer to the document 300, move the document 300 closer to the user device 200, etc.

Any sensor or combination of sensors 222 of user device 200 may be used to determine the location of document 300. For example, RGB sensors may be used to determine the location of document 300 based on changes in the detected colors of the verification image 602. In another example, proximity sensors may be combined with depth sensors, accelerometers, GPS, magnetometers, etc. to determine the location of document 300.

In some embodiments, determining the location of document 300 includes using audio emitters 234 and sensors 222 of user device 200. In some embodiments, audio emitters 234 emit audio signals at the document 300 or at the direction of document 300. The device 200 uses sensors 222 (e.g., a microphone) to capture audio signals (e.g., reflected audio signals, ambient sound, and/or any sounds from surrounding sources). The user device 200 uses the captured audio signals and the emitted audio signals to determine the location of the document 300 relative to the user device 200.

In some embodiments, the determined location of document 300 is used to determine one or more electromagnetic signal parameters. In some embodiments, the electromagnetic signal parameters are used to adjust the electromagnetic signals emitted by the electromagnetic signal emitters 220. Adjustments to the one or more electromagnetic signals include changes to the intensity, duration, direction, patterns (e.g. displaying different patterns, changing the size of the patterns, animating and/or switching between different patterns, etc.), colors, signal type (e.g., visible light, ultraviolet light, infrared, etc.), source (e.g., lasers, displays, LEDs, etc.), number of signals, and/or timing (e.g. strobe timing) of the emitted signals. In some embodiments, an electromagnetic emitter 220, based on the electromagnetic signal parameters, emits one or more first electromagnetic signals at a first time, and one or more second electromagnetic signals, at a second time distinct from the first time. In some embodiments, first electromagnetic signals are distinct from the second electromagnetic signals. In other embodiments, the first electromagnetic signals and the second electromagnetic signals are the same.

In some embodiments, the electromagnetic signal parameters are determined, in part, by the security feature that is to be detected. For example, if a security feature is an UV image, the electromagnetic signal parameters may include the use of a UV light. Different characteristics or patterns of the security features described in FIG. 3 may be used determine the type of electromagnetic signal emitter and/or the characteristics or patterns of the electromagnetic signals to be used (e.g., emitter identified in the electromagnetic signal parameters as well as the characteristics and/or patterns).

In some embodiments, the electromagnetic signal parameters are used to select (e.g., identify) one or more electromagnetic signal emitters 220. The electromagnetic signal emitters 220 are selected from lasers, LEDs, flashlights, flashes, strobe lights, displays, UV lights, and/or other emitters described in FIG. 2. In some embodiments, a first electromagnetic signal emitter 220 is selected at a first time to emit one or more first electromagnetic signals, and a second electromagnetic signal emitter 220, distinct from the first electromagnetic signal emitter 220, is selected at a second time to emit one or more second electromagnetic signals. In some embodiments, the first and second electromagnetic signals are the same. For example, a display (e.g., screen) of the user device 200 is used to emit one or more first signals at a first time and an LED of user device 200 is used to emit one or more second signals at a second time. Furthering the example, the display and LED may both emit flashes at the same intensity and duration. Alternatively and/or additionally, in some embodiments, the first and second electromagnetic signals are distinct. For example, the display may emit one or more patterns (e.g., displaying different light patterns or images) and the LED may emit rapidly flashing lights.

In some implementations, the determined location of document 300 at the first time ($t_0$) is used to adjust one or more electromagnetic signal parameters. In some embodiments, first verification image 602 is captured while the document 300 is exposed to the adjusted electromagnetic signals (e.g., document 300 hit by and/or subjected to electromagnetic signals adjusted via the one or more electromagnetic signal parameters). In some embodiments, first verification image 602 is analyzed to determine whether a first security feature of document 300 exposed to the one or more emitted electromagnetic signals meets security criteria.

In some embodiments, the location of document 300 at the first time ($t_0$) is used to determine whether to prompt user 402 to adjust the user device 200 and/or document 300. For example, in some embodiments, prior to adjusting the one or more electromagnetic signal parameters, the location of document 300 is used to determine whether document 300 meets capture criteria. In some embodiments, capture criteria are met when document 300 has a position, orientation, and/or distance relative to user device 200. In some embodiments, the capture criteria are met when the distance between document 300 and user device 200 meet minimum distance criteria (e.g., document 300 is 2 cm, 5 cm, 10 cm away from user device 200) and/or maximum distance criteria (e.g., document 300 is 1 m, 2 m, or 3 m away from user device 200). Alternatively and/or additionally, in some embodiments, capture criteria are met when the document 300 is within a predetermined range of the user device 200 (e.g., 30 cm.).

In some embodiments, the capture criteria are met when one or more security features of the document 300 are distinguishable from one another, detectable, and/or visible (e.g., while exposed to electromagnetic signals or not). In some embodiments, the capture criteria are met when the one or more security features of the document 300 may be recognized by OCR (optical character recognition), facial recognition, and/or other types of image processing. For example, first verification image 602 may be captured when text 312 becomes visible and/or may be processed by OCR. In another example, first verification image 602 may be captured when emitted electromagnetic signals make one or more security features visible or detectable (e.g., first verification image is captured, without user intervention, in response to the a determination that one or more security features, corresponding to an identified document type, are detectable). Alternatively or additionally, in some embodiments, the capture criteria are met when the document 300 is moved within and/or near predetermined location indicator 608 (e.g. based on determined location of document 300). In some embodiments, the capture criteria are met when the determined location of document 300 meets a predetermined threshold from the predetermined location indicator 608 (e.g., each corner of document 300 is 1 cm, 2 cm, and/or 3 cm from respective corners of the predetermined location indicator 608). For example, the capture criteria are met when each corner of document 300 is near and/or makes contact with a respective corner of predetermined location indicator 608 shown in FIG. 6B.

FIGS. 6A and 6B further illustrate an example prompt to adjust the position of the document in accordance with some embodiments. In some embodiments, capture interface 600 displays one or more instructions 606 prompting user 402 to adjust the position of document 300 and/or user device 200. In some embodiments, instructions 606 are provided as audio, via audio emitter(s) 234. In some embodiments, user device 200 includes haptic feedback to prompt user 402. For example, instructions 606 prompt user 402 to move document 300 closer to user device 200 and/or cameras 218. In some embodiments, the capture criteria include a determination that the user has satisfied the instructions 606. In accordance with a determination that the capture criteria are met (e.g., moving document 300 within and/or near predetermined location indicator 608, as shown in FIG. 6B) the one or more electromagnetic signal parameters are adjusted and second verification image 652 is captured.

Also shown in FIG. 6B is the capture of second verification image 652 in accordance with capture criteria being satisfied (e.g., improved visibility and/or detectability such that image processing can be performed on one or more security features). In some embodiments, second verification image 652 is generated by user device 200 at a second time ($t_1$) and at a second location (e.g. $d_1$) of document 300 after the visibility and/or detectability of the one or more security features is improved (e.g., capture criteria are met). In some embodiments, the second verification image 652 is an image frame from a video sequence, sequence of images, and/or a single still image. In second verification image 652, the one or more security features, such as facial image 302, perforations 306, scratch 308, text 312, tactile feature 314 are distinguishable from each and/or independently analyzed. In some embodiments, second verification image 652 further includes time stamp 654 corresponding to the second time ($t_1$) and is used to authenticate document 300.

Additionally and/or alternatively, in some embodiments, movement of user 402, user device 200, and/or document 300 is analyzed between the first time ($t_0$) and the second time ($t_1$) to authenticate document 300. In particular, movement of document 300 is analyzed between to and $t_1$ to determine that movement of document 300 is consistent and not a spoofed image (e.g., an invalid and/or false document being disguised as document 300). In some embodiments, movement includes side-to-side, forward, backward, up, down, rotation, pitch, yaw, roll, and or other movement. For example, the first location and the second location of document 300 are analyzed to determine that the one or more security features of document 300 are consistent between movement with minimal inconsistencies (e.g., poor network connection) between to and $t_1$. In some embodiment, the one or more security features are analyzed when exposed to one or more electromagnetic signals to determine whether the document 300 is authentic (e.g., not a spoofing attempt and/or the security features meet matching criteria with stored security features). For example, a security feature (e.g. facial image 302) may include a glare and/or secondary image (e.g. UV image) that is visible under UV light and UV light is emitted from the electromagnetic emitters 220 of user device 200 at to and $t_1$ to capture the security feature. The facial image 302 is analyzed to determine that the glare and/or secondary image is detected and/or captured under UV light and the different images compared at time to and $t_1$ (e.g. first verification image 602 and second verification image 652) are compared to ensure the facial image 302 is consistent.

In some implementations, the determined location of document 300 at the second time ($t_1$) is used to adjust one or more electromagnetic signal parameters. In some embodiments, second verification image 652 is captured while the document 300 is exposed to the adjusted electromagnetic signals (e.g., document 300 is subjected to electromagnetic signals that are adjusted according to the one or more electromagnetic signal parameters). In some embodiments, second verification image 652 is analyzed to determine whether a second security feature of document 300 exposed to the one or more emitted electromagnetic signals meets security criteria. In some embodiments, the first and second security features exposed to respective emitted electromagnetic signals are analyzed to determine whether security criteria is met. In some embodiments, the first and the second security features are distinct. In some embodiments, the first and the second security features are the same. Additionally or alternatively, in some embodiments, the first verification image 602 and the second verification image 652 are captured in the same position with one or more distinct electromagnetic signals emitted towards document 300.

In some embodiments, determining that the security criteria are met includes determining that one or more detected and/or captured security features match predetermined characteristics and/or patterns of stored security features corresponding to the document type, document variations and/or document origin of document 300. In some embodiments, the security features are detected and/or captured while exposed to one or more electromagnetic signals (e.g., having one or more electromagnetic signals emitted towards document 300). Alternatively and/or additionally, in some embodiments, the security features are detected and/or captured without being exposed to one or more electromagnetic signals. In some embodiments, determining whether the security criteria are met includes comparing the detected and/or captured security features while exposed to electromagnetic signals with the security features that are detected and/or captured while not exposed to electromagnetic signals, and determining that the compared security features meet predetermined characteristics and/or patterns of stored security features corresponding to the document type, document variations and/or document origin of document 300.

In some embodiments, meeting security criteria is based on security features matching one or more predetermined characteristics and/or patterns between subsequently captured first verification images 602. For example, one or more first verification images 602 are captured while the first location is determined and/or while one or more first electromagnetic signals are emitted, the one or more first verification images are compared to one another to determine whether the detected respective security features between the one or more first verification images 602 meet the predetermined characteristics and/or patterns. Alternatively and/or additionally, in some embodiments, determining whether the security criteria is/are met includes comparing captured first verification image 602 exposed to electromagnetic signals with stored security features and/or standard security features corresponding to the document type, document variations and/or document origin of document 300 (e.g., under similar conditions).

For example, a passport includes security features at predetermined locations on the passport and/or with predetermined characteristics. Computer system 100 and/or user device 200 include stored security features of the passport with the predetermined locations and the predetermined characteristics (e.g., security features exposed to electromagnetic signals as well as the security features not exposed to electromagnetic signals). The one or more security features of the passport are compared with one or more security features of document 300 captured in first verification image 602 with or without electromagnetic signals emitted towards document 300. Based on a determination that the one or more security features of the passport and the one or more detected and/or captured security features of document 300 meet the security matching criteria (e.g., consistent security feature effects (described in FIG. 3), consistent properties of the security features (e.g., sizes, proportions, colors, etc.), consistent locations, etc.), document 300 is authenticated.

As mentioned above, in some embodiments, determining whether the security criteria are met includes comparing the first verification image 602 (e.g., document 300 while exposed to electromagnetic signals or not) with the second verification image 652 (e.g., document 300 while exposed to electromagnetic signals or not). In some embodiments, the security criteria are not met when one or more expected security features are not detected. For example, the security criteria are not met when a UV image is not detectable and/or visible when document 300 is moved to expose the hologram 310. In some embodiments, the security criteria are not met when one or more security features are not detected and/or captured at the predetermined locations for the security features of document 300. For example, the predetermined location of text 312 of document 300 may be near the center right edge of document 300 and, thus, text 312 detected and/or captured at a different location (e.g., bottom left corner of document 300) would not meet the security criteria.

In some embodiments, predetermined characteristics and/or patterns of the security features that become apparent (e.g., detectable) when exposed to electromagnetic signals include reflection of light, exposure of hidden features by different light sources and/or frequencies, glares, outlines, shadowing effects (e.g., debossed and embossed features creating impressions and/or bumps). The particular characteristics and/or patterns corresponding to one or more security features are stored on computer system 100 and/or user device 200 and used to authenticated detected and/or captured security features of document 300. Examples of the patterns and the characteristics of the one or more security feature are described in FIG. 3.

In some embodiments, in accordance with a determination that the security criteria is met, the document 300 is authenticated (e.g., which produces authentication information) and authentication information is transmitted to the user device 200 and/or a remote third party 160 (e.g., a remote third party requesting authentication to complete a transaction and/or perform an action). Additionally or alternatively, in some embodiments, in accordance with a determination that the security criteria is not met, invalidation information is transmitted to the user device 200 and/or a remote third party 160. In some embodiments, the invalidation information includes instructions or a request for the user 402 to provide an additional capture of document 300. In some embodiments, invalidation information terminates the authentication process.

Figures 7A, 7B:
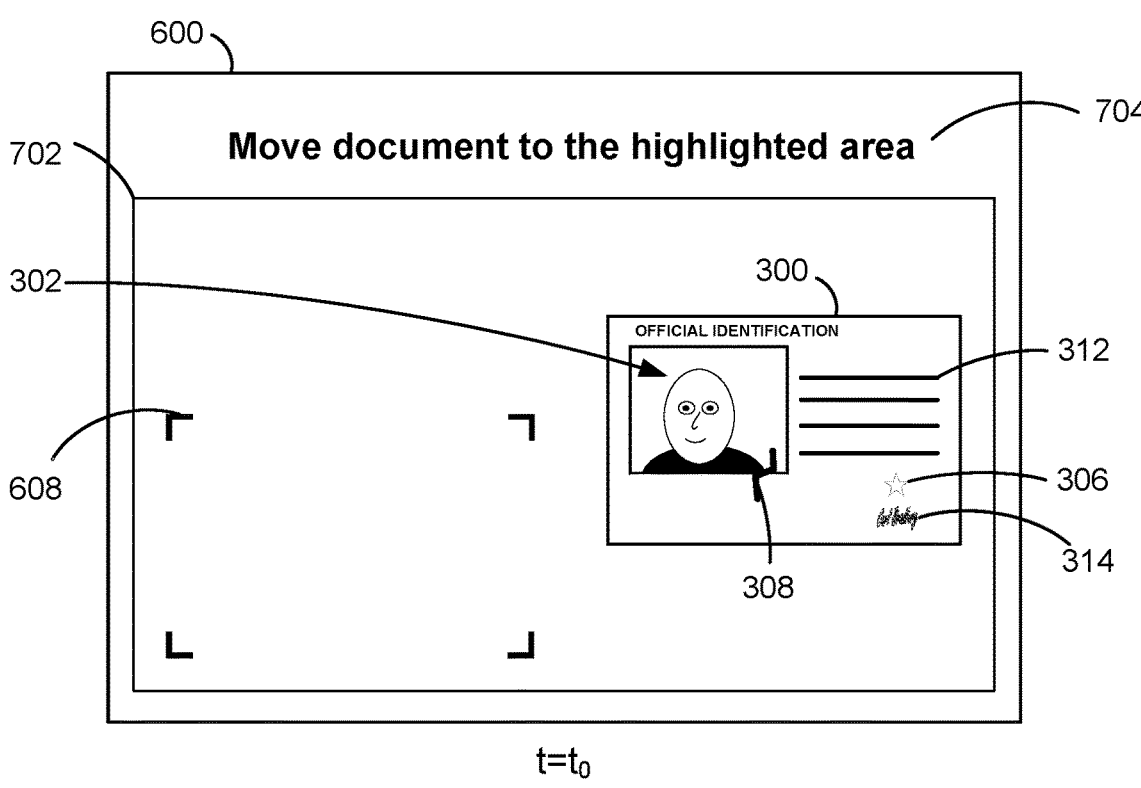
FIGS. 7A-7B illustrate the capture of verification images as a document is moved to specific locations of a capture frame and electromagnetic signals are emitted towards the document, in accordance with some embodiments.

FIGS. 7A and 7B illustrate another exemplary capture by user device 200 and/or system 100 in accordance with some embodiments. FIGS. 7A and 7B include interface 600 and/or predetermined location indicator 608 as described above in 6A and 6B. Additionally, the location of document 300 and the electromagnetic signal parameters are determined as discussed above in FIGS. 6A and 6B. In FIG. 7A, capture interface 600 includes first verification image 702. First verification image 702 is generated by user device 200 at a first time (t₀) and at a first location of document 300. First verification image 702 includes an image of document 300 that includes one or more security features, such as facial image 302, perforations 306, scratch 308, text 312, tactile features 314, etc. In some embodiments, the first verification image 702 is an image frame from a video sequence, sequence of image, and/or a single still image.

In some embodiments, the determined location of document 300 is used to prompt user 402 to adjust the user device 200 and/or document 300 to capture one or more security features and/or determine electromagnetic signal parameters. For example, in some embodiments, user device 200 prompts user 402, via instructions 704, to move document 300 to a predetermined location (e.g. predetermined location indicator 608). User device 200 uses the determined location of document 300, and/or uses the motion of the document 300 and/or user device 200 (e.g., from initial location to predetermined location indicator 608) to determine one or more electromagnetic signal parameters. The one or more determined electromagnetic signal parameters are further used to adjust the emitted one or more electromagnetic signals. The emitted one or more electromagnetic signals are configured to determine that one or more detected and/or captured security features meet security criteria.

In some embodiments, verification images 702 are captured as document 300 moves from the initial location to predetermined location indicator 608. Alternatively or additionally, in some embodiments, verification image 702 is captured when capture criteria are met, as discussed above in FIGS. 6A and 6B. For example, in some embodiments, capture criteria are met when document 300 is within and/or near predetermined location indicator 608 (e.g., based on determined location of document 300).

FIGS. 7A and 7B illustrate another example of prompting user 402 to adjust document 300 and/or user device 200. Capture interface 600 displays one or more instructions 704 prompting user 402 to adjust the position of document 300 and/or user device 200 as discussed above in FIGS. 6A and 6B. For example, instructions 704 prompt user 402 to move document 300 to a predetermined location indicator 608 (either via movement of document 300 and/or user device 200). In some embodiments, user device 200 repeatedly prompts user 402 to move user device 200 and/or document 300 (e.g., until the predetermined location 608 is reached). In some embodiments, the repeated prompts indicate gradual progress and/or reaching the predetermined location 608. In some embodiments, user device 200 continually evaluates the adjusted position of the document 300 relative to user device 200 to determine whether user 402 is following the instructions and/or whether the device is approaching or has reached the predetermined location. In accordance with a determination that the capture criteria are met, the one or more electromagnetic signal parameters are adjusted and second verification image 752 is captured. Alternatively or additionally, in some embodiments, if it is determined that the document is not being adjusted, the process terminates until the user reinitiates the authentication process.

FIG. 7B illustrates capture interface 600 which includes second verification image 752, in accordance with some embodiments. In some embodiments, second verification image 752 is generated by user device 200 at a second time ($t_1$) and at a second location of document 300 (e.g. after capture criteria are met and/or during adjustment, as discussed above). Second verification image 752 shows document 300. In some embodiments, second verification image 752 includes document 300 with one or more detected and/or captured security features that were not present in the first verification image 702. For example, second verification image 752 includes hologram 310 that was not previously captured and/or detected in the first verification image 702. In some embodiments, the position/location of the predetermined location indicator 608 is determined in order to detect and/or capture one or more security features, such as hologram 310, with one or more electromagnetic signals. For example, the predetermined location indicator 608 may guide a user 402 to move document 300 to a specific location in order to detect or/or capture a particular security feature.

In some embodiments, the response of the one or more detected and/or captured security features, such as hologram 310, is used to determine if the security criteria is met. For example, if an electromagnetic signal emitted while document 300 is at the predetermined location indicator 608 is expected to enable the capture or detection of hologram 310, the presence or absence of hologram 310 is used to determine if the security criteria is met. Similarly, if an electromagnetic signal is not expected to enable the capture or detection of hologram 310, the presence or absence of hologram 310 is used to determine if the security criteria is met. In some embodiments, the determination of whether the security criteria is met is based on respective security features matching one or more predetermined characteristics and/or patterns. The security features and their corresponding security criteria and expected responses are defined above in relation to FIG. 3. Examples of determining whether the security criteria is met are discussed in FIGS. 6A and 6B.

Figure 8A:
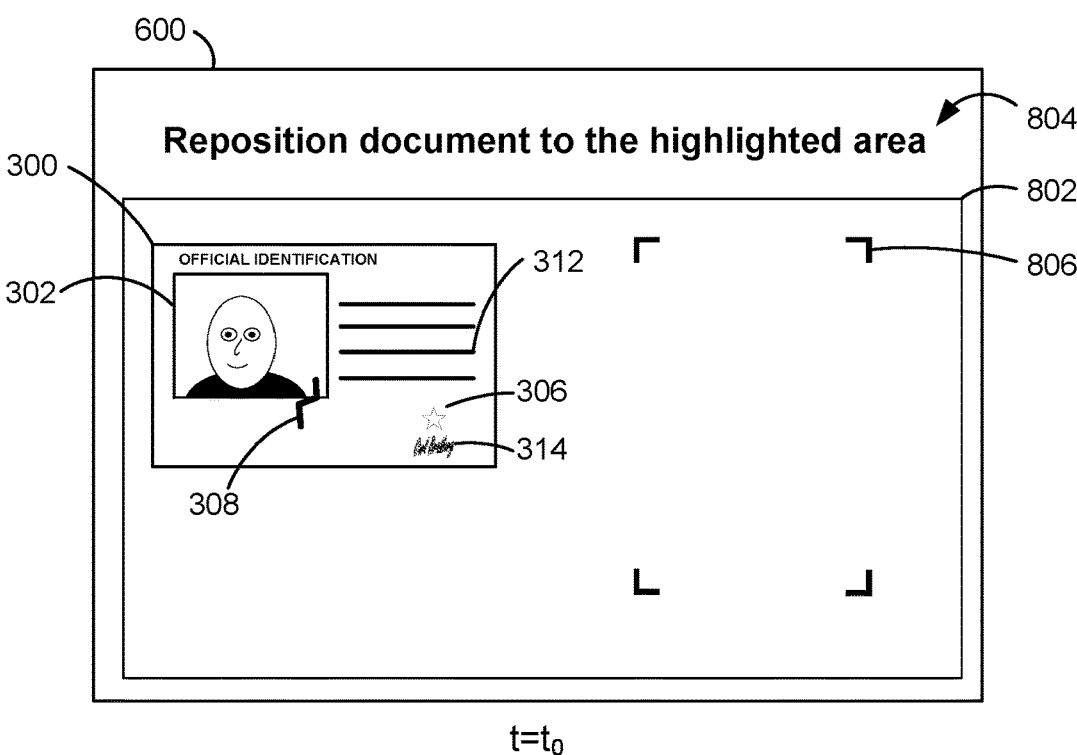
FIGS. 8A-8B illustrate adjustments to the orientation of a document while verification images are captured and electromagnetic signals are emitted towards the document, in accordance with some embodiments.
Figure 8B:
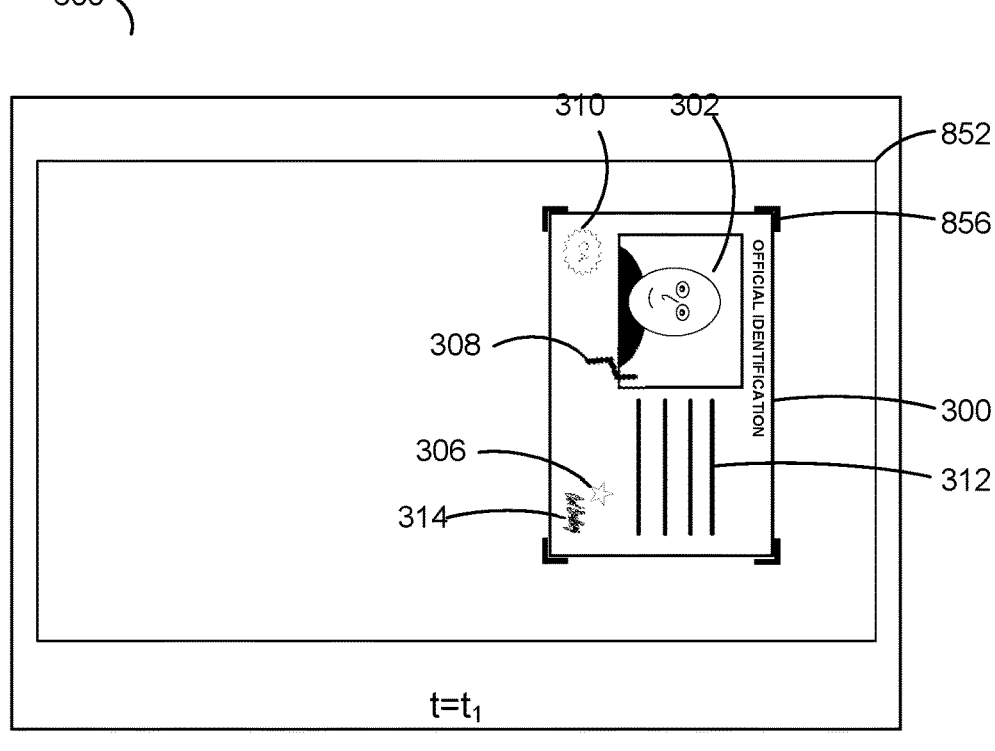

FIGS. 8A and 8B illustrate another depiction of capture interface 600 in accordance with some embodiments. FIGS. 8A and 8B include all of the features discussed above in FIGS. 6A-7B. FIGS. 8A and 8B include capture interface 600, first verification image 802, second verification image 852, document 300, one or more security features, predetermined location indicator 608, and/or one or more instructions 804. The one or more security features include facial image 302, perforations 306, scratch 308, text 312, tactile features 314, hologram 310, etc. As further discussed above, the first verification image 802 is generated by user device 200 at a first time ($t_0$) and at a first location of document 300 and the second verification image 852 is generated by user device 200 at a second time ($t_1$) and at a second location of document 300. The first location and the second location may be the same or distinct.

FIGS. 8A and 8B illustrate a prompt to change the orientation document 300 and/or user device 200. Capture interface 600 displays one or more instructions 804 prompting user 402 to adjust the orientation of document 300 and/or user device 200 as discussed above in FIGS. 6A-8B. In some embodiments, the predetermined location indicator 608 has a predetermined orientation (e.g. document 300 is rotated by 45 degrees, 90 degrees, etc.) as shown in FIGS. 8A and 8B.

FIG. 8B illustrates second verification image 852 with document 300 reoriented and/or user device 200 moved to within the predetermined location 608. In some embodiments, first verification image 802 is captured while the user device 200 and/or document 300 has a first position and second verification image 852 is captured while the user device 200 and/or document 300 has a second position, such as the location of the predetermined location indicator 608. For example, first verification image 802 includes document 300 in an upright position and first verification image 802 includes document 300 rotated by approximately 90 degrees relative to the upright position. The different orientation of the document 300 between the first verification image 802 and the second verification image 852 are used to determine corresponding electromagnetic signal parameters. The electromagnetic parameters are used to adjust the electromagnetic signals emitted towards document 300. In particular, the one or more detected and/or captured security features in the verification images are used to determine whether the security criteria has been met. Examples of determining whether the security criteria is met are discussed above in FIG. 6A-7B.

In some embodiments, the first verification image 802 and the second verification image 852 are captured with at least two cameras 218. In some embodiments, the first verification image 802 is captured using a first camera 218 and the second verification images 852 is captured using a second camera 218. In some embodiments, the first and second cameras 218 are the same. Alternatively or additionally, in some embodiments, the first and second cameras 218 are distinct. For example, the first camera can be a "tele" (telephoto) camera and the second camera can be a "wide" (wide-angle lens) camera. In some embodiments, the first camera is on a first surface of the user device 200 (e.g., front-facing or selfie camera while) and the second camera is on a second surface of the user device 200, the second surface distinct from the first surface (e.g., the second camera is rear-facing camera). In some embodiments, the first camera includes one or more lenses configured for image capture using a first focal length (or first range of focal lengths) and the second camera includes one or more lenses for image capture using a second focal length (or second range of focal lengths).

In some embodiments, the first verification image 802 and second verification image 852 are captured while the same electromagnetic signals is emitted towards document 300; while distinct electromagnetic signals are emitted towards document 300; while a single verification image (e.g. second verification image 852) has electromagnetic signals is emitted towards document 300; or any variation thereof.

In some embodiments, different cameras 218 detect and/or capture distinct security features that are used determine if security criteria is met. For example, an ultra-wide camera may capture a greater number security features as well as distort one or more security features, and a wide angle or tele camera may provide greater detail to security features. Different cameras 218 produce different detections and/or captures of the one or more security features. The detected and/or captured security features are used to determine if security criteria is met as discussed above.

Figure 9A:
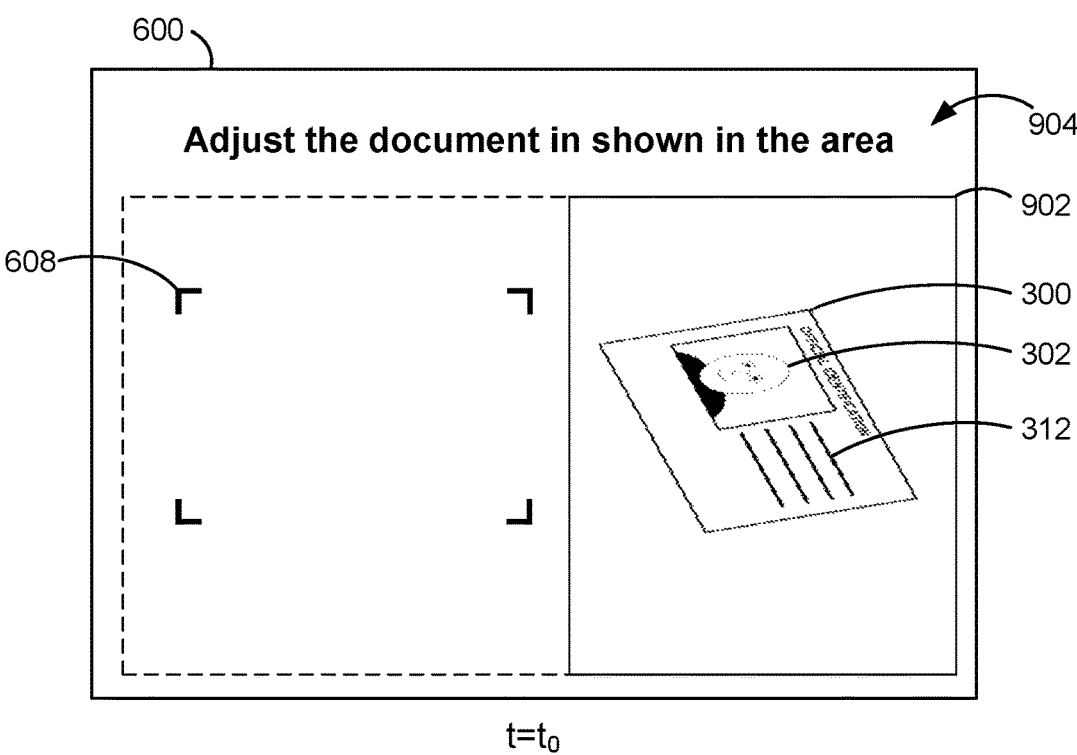
FIGS. 9A-9B illustrate a document being tilted to and/or from specific locations while verification images are captured and electromagnetic signals are emitted toward the document, in accordance with some embodiments.
Figure 9B:
Figure 9B:
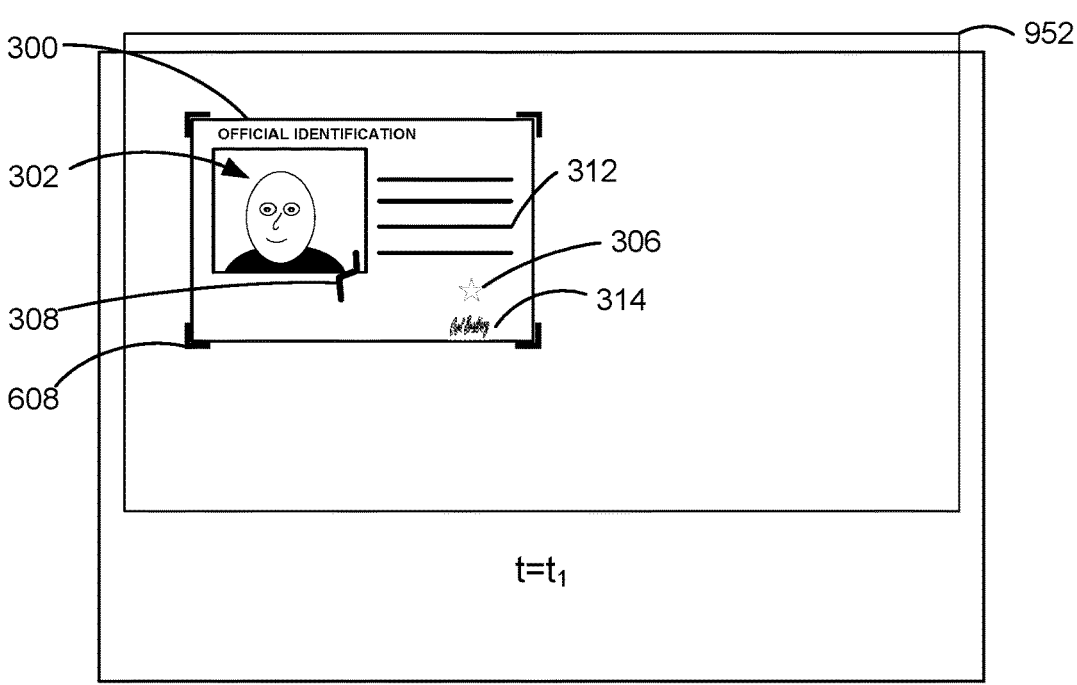

FIGS. 9A and 9B illustrate another example capture of document 300 in accordance with some embodiments. FIGS. 9A and 9B determine the location of document 300 and the electromagnetic signal parameters as discussed above in FIGS. 6A-8B. FIGS. 9A and 9B include capture interface 600, first verification image 902, second verification image 952, document 300, one or more security features, predetermined location indicator 608, and/or one or more instructions 904. The one or more security features include facial image 302, perforations 306, scratch 308, text 312, tactile features 314, etc. As further discussed above, the first verification image 902 is generated by user device 200 at a first time ($t_0$) and at a first location of document 300 and the second verification image 952 is generated by user device 200 at a second time ($t_1$) and at a second location of document 300. The first location and the second location may be the same or distinct. Examples of determining whether the security criteria is met are discussed in FIGS. 6A-8B.

FIGS. 9A and 9B illustrate a prompt to adjust the tilted document 300. Capture interface 600 displays one or more instructions 904 prompting user 402 to adjust the tilted document 300 into a flat position. As discussed above, in some embodiments, the first verification image 902, or images, are captured as document 300 moves from its initial position at to $t_0$ a second position at $t_1$. In some embodiments, the first verification image 902 is used to determine if security criteria is met. In some embodiments, the first verification image 902 is captured while one or more electromagnetic signals are emitted towards document 300. FIG. 9B illustrates second verification image 952 with document 300 positioned within predetermined location indicator 608 as discussed above. In some embodiments, second verification image 952 is captured as document 300 enters the predetermined location indicator 608. Similarly, in some embodiments, the second verification image 952 is captured while one or more electromagnetic signals are emitted towards document 300. In some embodiments, the second verification image 952 is used to determine if security criteria is met. Additionally or alternatively, in some embodiments, both the first verification image 902 and the second verification image 952 are used to determine if security criteria is met.

Figure 10A:
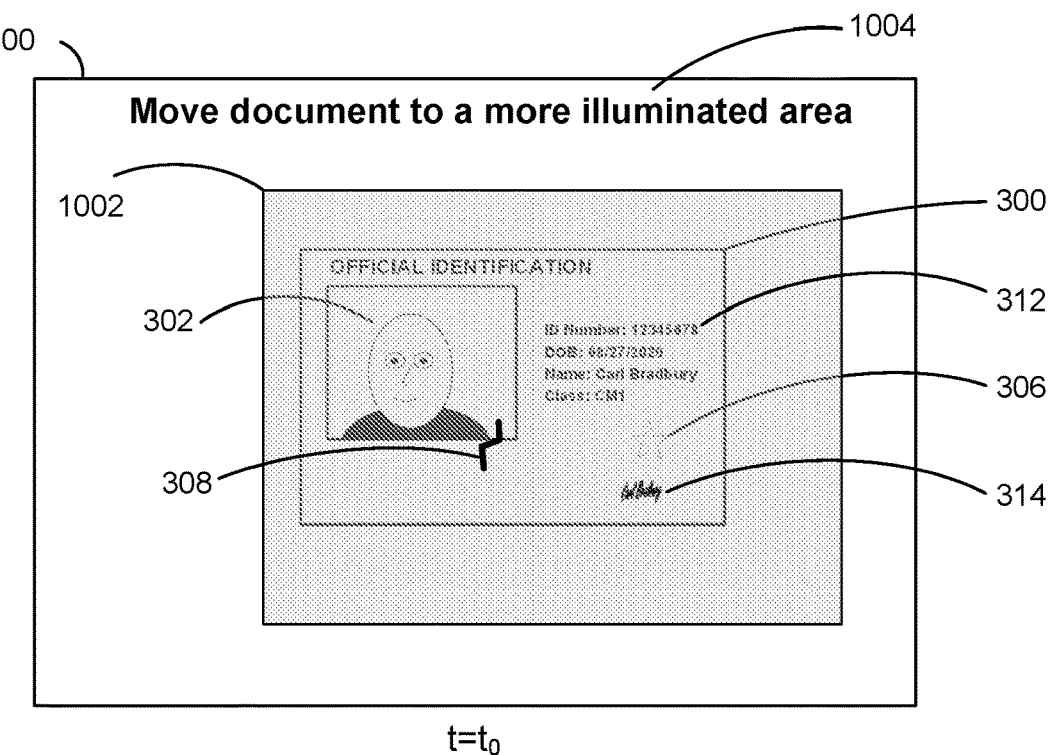
FIGS. 10A-10B illustrate adjustments to the lighting of a document to capture verification images and emit additional electromagnetic signals towards the document, in accordance with some embodiments.
Figure 10B:
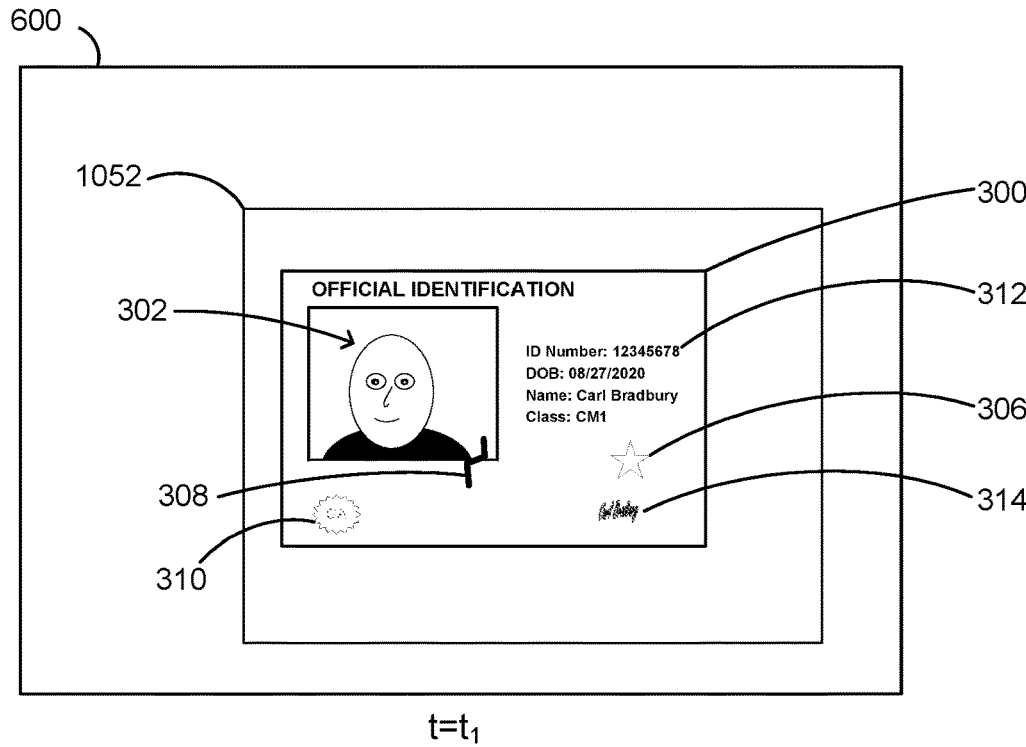

FIGS. 10A and 10B illustrate another variation to capture by user device 200 and/or system 100 in accordance with some embodiments. FIGS. 10A and 10B determine the location of document 300 and the electromagnetic signal parameters as discussed above in FIGS. 6A-9B. FIGS. 10A and 10B include capture interface 600, first verification image 1002, second verification image 1052, document 300, one or more security features, and/or one or more instructions 1004. The one or more security features include facial image 302, perforations 306, scratch 308, hologram 310, text 312, tactile features 314, etc. As discussed above, the first verification image 1002 is generated by user device 200 at a first time ($t_0$) and at a first location of document 300 and the second verification image 1052 is generated by user device 200 at a second time ($t_1$) and at a second location of document 300. The first location and the second location may be the same or distinct. Examples of determining whether the security criteria is met are discussed in FIGS. 6A-9B.

In some embodiments, adverse capture conditions do not allow for the one or more security features to be readily detected and/or captured. Adverse capture conditions include poor lighting, dirty or covered camera lens (e.g., generating poor quality images obscured by dirt, smudges, etc.), erratic or fast movement of the user device 200 and/or document 300 (e.g., device is not able to capture an image of document 300), etc. In some embodiments, the adverse conditions are detected via sensors 222 and/or cameras 218. For example, lighting conditions may be determined by one or more lighting sensors of the camera 218 or of the user device 200; movement of the document 300 or user device 200 (as determined above in FIGS. 6A-9B) may be used to determine that a verification image cannot be captured; cameras 218 may detect that there is an obstruction on the lens, etc.

As shown in FIG. 10A, the first verification image 1002 includes document 300 in poor lighting conditions. In some embodiments, one or more electromagnetic signals are adjusted (e.g., via determined electromagnetic signal parameters) to compensate for the adverse conditions such that the one or more security features are readily captured and/or detected. For example, in poor lighting conditions, the user device may activate one or more electromagnetic signals to adjust the lighting as needed, increase the intensity of the electromagnetic signals, increase the rate or speed at which the electromagnetic signals are emitted, etc. In some embodiments, different cameras 218 may be used to compensate for the adverse conditions. For example, a dirty first camera 218 may result in the use of a second camera 218 of user device 200. In some embodiments, user device 200 may include a night vision camera that is able to capture images in poor lighting. In some embodiments, the first verification image 1002 and the second verification image 1052 are captured while the one or more electromagnetic signals and/or cameras 218 compensate for adverse conditions. The captured and/or detected security features in the first verification image 1002 and the second verification image 1052 are used to determine if the security criteria are met, as discussed above.

Alternatively and/or additionally, in some embodiments, as illustrated in FIGS. 10A and 10B, user 402 may be prompted to adjust the document 300 and/or user device 200 to correct the adverse conditions. For instance, instructions 1004 prompt the user to move the document to an area with more light. In some embodiments, instructions 1004 include telling the user to move to a brighter area; recommending the user clean the lens for better results; recommending the user to switch to a different camera of user device 200; request the user move slower; etc. In some embodiments, the first verification image 1002 and the second verification image 1052 are captured based on a determination that capture criteria is met, as described above in FIGS. 6A and 6B. In some embodiments, the capture criteria include correction and/or removal of the adverse conditions described herein. The first verification image 1002 and the second verification image 1052 are used to determine that the security criteria is met as further discussed in FIGS. 6A and 6B.

Figure 11A:
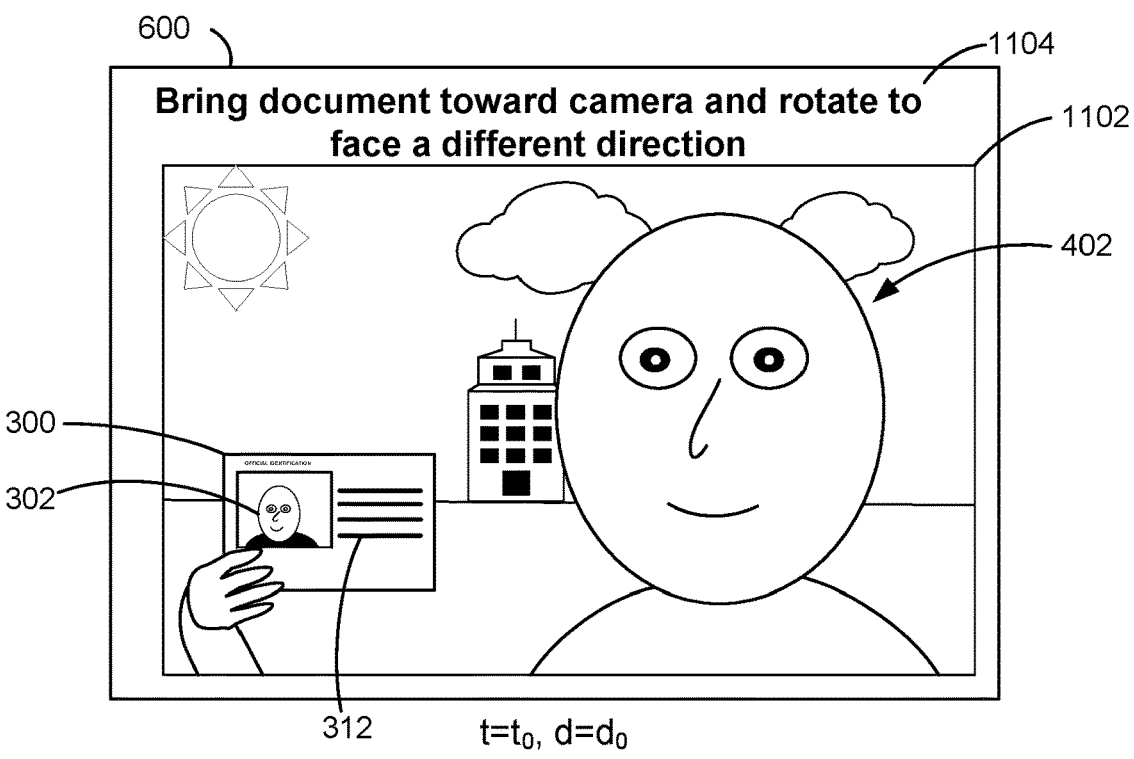
FIGS. 11A and 11B illustrate the capture of verification images as a user and/or document moves within a capture frame, in accordance with some embodiments.
Figure 11B:
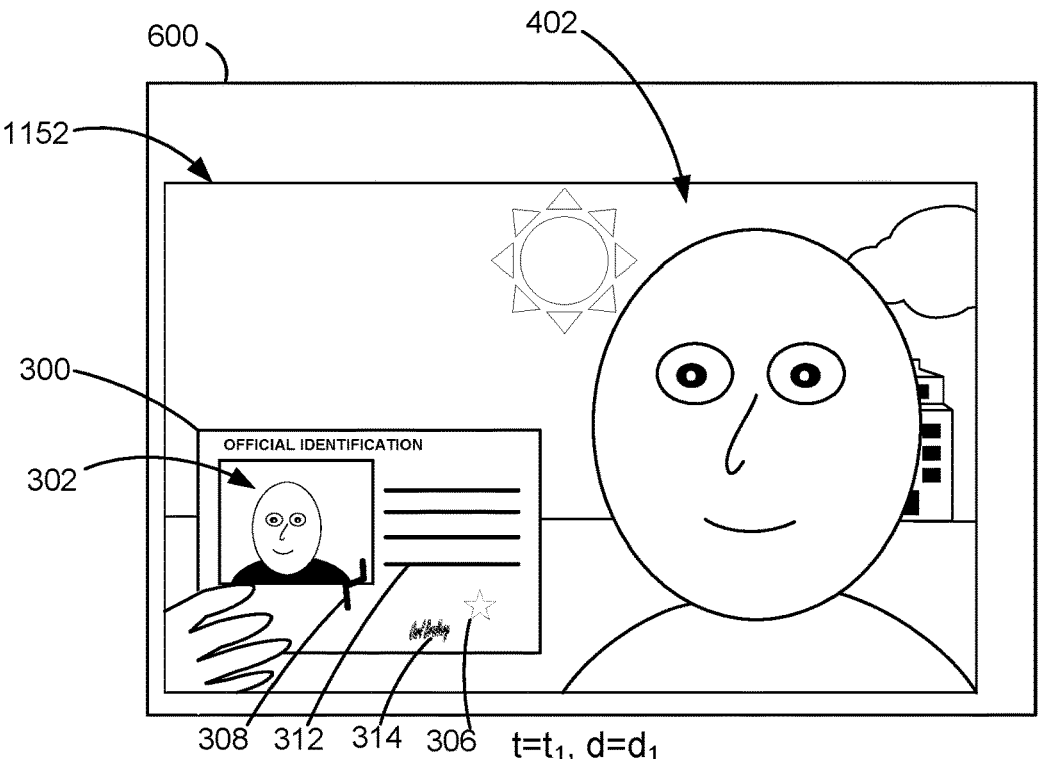

FIGS. 11A and 11B illustrate an additional example for authenticating a document in accordance with some embodiments. FIGS. 11A and 11B determine the location of document 300 and the electromagnetic signal parameters as discussed above in FIGS. 6A-10B. FIGS. 11A and 11B illustrate capture interface 600, first verification image 1102, second verification image 1152, document 300, one or more security features, and/or one or more instructions 1104. The one or more security features include facial image 302, perforations 306, scratch 308, text 312, tactile features 314, etc. FIGS. 11A and 11B further illustrate authentication of a documents using a kiosk (e.g. FIG. 5), front-facing camera (e.g., selfie camera; FIG. 4).

FIGS. 11A and 11B illustrate user device 200 and or system 100 prompting user 402 via instructions 1104 to perform a specific action. For example, displayed instructions 1104 prompt user 402 to rotate while holding user device 200 and/or document 300 and/or to bring document 300 forward. The user 402 may be asked to perform a full rotation from left-to-right and from right-to-left while tracking the movement using the available sensors (e.g., accelerometer, gyroscope, and/or one or more electromagnetic signals). Optionally, in some embodiments, the movement prompt includes instructions to rotate, translate, and/or pitch user device 200 and/or the document 300. The location of document 300 is determined as discussed above in FIGS. 6A-10B. The location information is used to determine electromagnetic signal parameters for adjusting the one or more electromagnetic signals.

In some embodiments, movement of the document 300 and/or the user device 200 is analyzed to determine whether the movement is consistent. In some embodiments, movement is analyzed by capturing verification images (e.g., first verification image 1102 and second verification images 1152) as the instructions are being performed. Movement is consistent when the one or more security features of document 300 meet security matching criteria as the user device 200 and/or document 300 is moved. Additionally or alternatively, one or more electromagnetic signals are emitted towards document 300 as document 300 and/or user device 200 is moved and verification images are captured to detect and/or capture the one or more security features. The verification images are used for determining that the security criteria is met as discussed above in FIGS. 6A-10B. Alternatively or additionally, in some embodiments, second verification image 1152 is captured after the capture criteria is met (e.g., completion of the instructions 1104). In some embodiments, one or more electromagnetic signals are emitted towards document 300 as the second verification image 1152 is captured and the second verification image 1152 is used to determine if the security criteria is met.

In some embodiments, movement is further analyzed to determine irregularities in movement, spoofing attempts, inconsistencies between frames, irregular changes in light, irregularities in the one or more audio signals, and/or any other non-compliant motion indicators. For example, the first verification image 1102 and the second verification image 1152 include environmental information (e.g., clouds, sun, and building). In some embodiments, the environmental information is analyzed as the user 402 performs the instruction 1104 to ensure that false images have not been replaced with original image. In particular, environmental information is used to determine that prevalent features of the environment are consistent between captured frames (e.g., buildings do not randomly disappear or jump to different locations, sun jumps inconsistently, etc.). In some embodiments, successive captured frames are compared to one another to determine that the movement between frames is consistent. Similar to the descriptions above, successive frames can be compared to determine consistency in the captured and/or detected security features as well as consistency in environmental information between frames. In some embodiments, the environmental information in the first verification image 1102 and the second verification image 1152 is cross checked with data obtained from sensors 222 of user device 200 and/or other device information (e.g., time of day). For example, if the time of day is 7:00 PM and the verification images show a sunrise, then the image is likely false. In another example, if the verification image includes user 402 standing in front of a building but the GPS indicate that the user 402 is sailing in the pacific, the image is likely false.

Figure 12A:
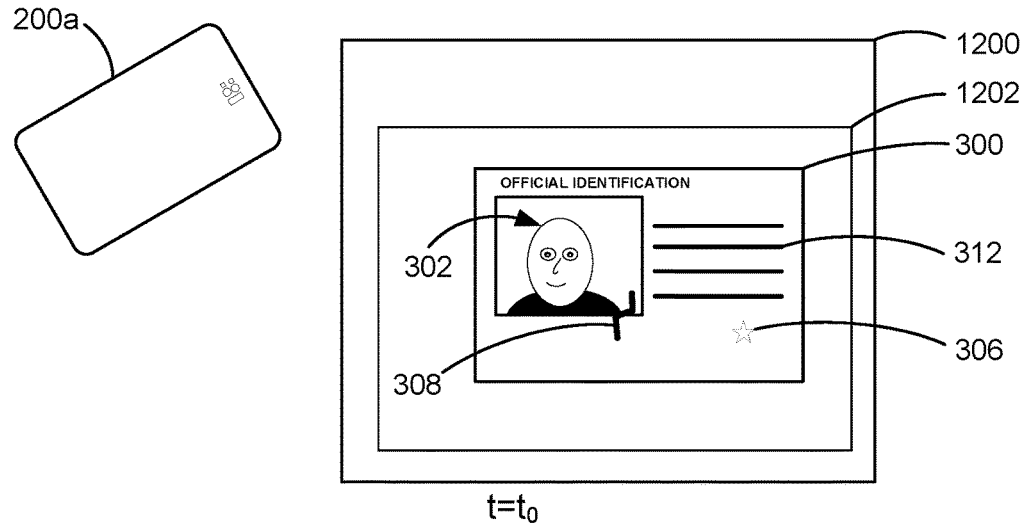
FIGS. 12A-12C illustrate capture of verification images while electromagnetic signals are emitted, in accordance with some embodiments.
Figure 12B:
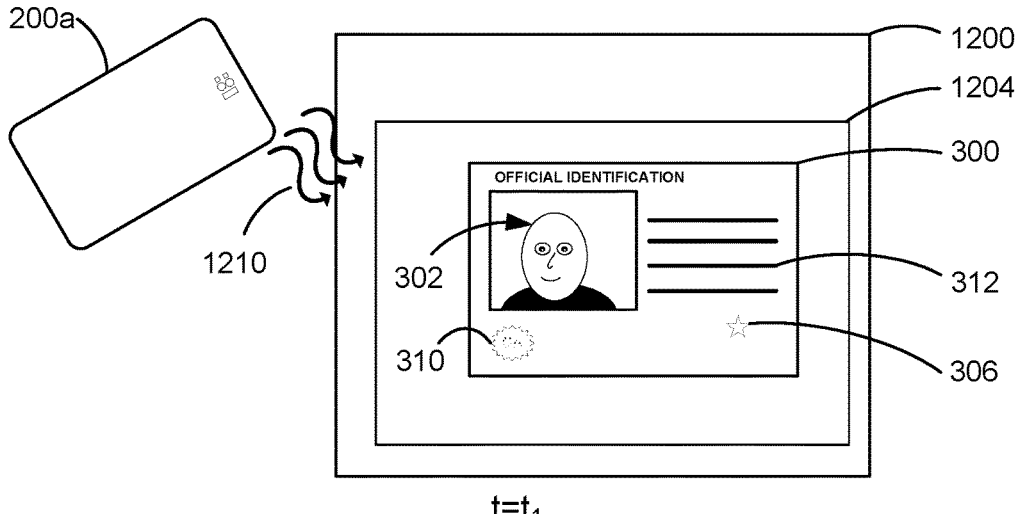
Figure 12C:
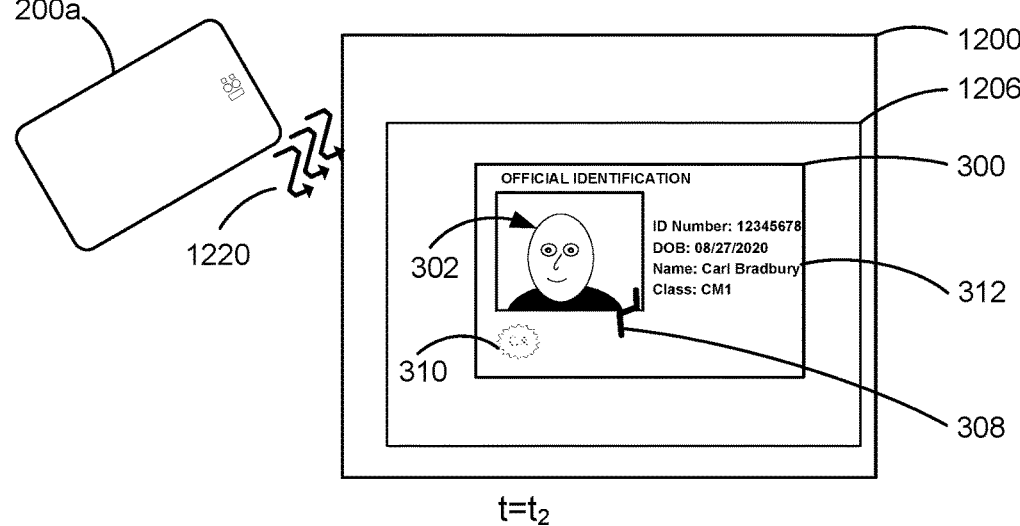

FIGS. 12A-12C illustrate one or more electronic signals emitted by user device 200 and/or system 100, in accordance with some embodiments. In FIGS. 12A-12C, user device 200 determines the location of document 300 and electromagnetic signal parameters as discussed above in FIGS. 6A-11B. FIG. 12A-12C shows capture interface 1200, one or more verification images (e.g., images 1202, 1204, and 1206), document 300, one or more security features. The one or more security features include facial image 302, perforations 306, scratch 308, text 312, hologram 310, etc. As discussed above, the verification images are generated by user device 200 at corresponding times (e.g., first time ($t_0$) for the first verification image 1202, second time ($t_1$) for the second verification image 1204, and third time ($t_2$) for the third verification image 1206).

In some embodiments, the location of document 300 and one or more electromagnetic signal parameters are determined at the first time ($t_0$); however, one or more electromagnetic signals are not emitted as the verification images (e.g., first verification image 1202) are captured. For example, first verification image 1202 may be captured at the first time ($t_0$) without any electromagnetic signals emitted towards document 300. The first verification image 1202 may be used to determine if the presence and/or absence of detected and/or captured security features meet the security criteria as described above. Additionally or alternatively, in some embodiments, one or more electromagnetic signal parameters are adjusted using the determined location of document 300 at the first time ($t_0$) and the first verification images 1202 is captured, via cameras 218, while one or more electromagnetic signals are emitted towards document 300.

In some embodiment, data corresponding to the first verification image 1202 is stored in document database 110 or locally on a user device 200. For example, data including the location of document 300, electromagnetic signal parameters, sensor information, device information (e.g., time, GPS information, etc.), metadata, etc. corresponding to the first verification image 1202 is stored. The stored data is used to verify subsequent verification images, improve the database of security features, improve the performance of the system, etc. In some embodiments the stored data further includes camera parameters (e.g., exposure time, sensitivity, frame-rate, gain, and/or any of the available camera parameters).

In some embodiments, the first verification images 1202 captured without one or more electromagnetic signals emitted towards document 300 are analyzed to determine whether the security features of the document 300 meet security criteria as discussed above. Additionally or alternatively, in some embodiments, the first verification images 1202 captured while one or more electromagnetic signals emitted towards document 300 are analyzed to determine whether the security features of the document 300 meet security criteria as discussed above.

FIG. 12B illustrates emitting first electromagnetic signals at document 300 in accordance with some embodiments. In some embodiments, one or more electromagnetic signal parameters are determined using the determined second location of the document 300 at the second time ($t_1$). In some embodiments, the electromagnetic signal parameters determined at the second time ($t_1$) are the same as the electromagnetic signal parameter determined at the first time ($t_0$). In some embodiments, the electromagnetic signal parameters determined at the second time ($t_1$) are distinct from the electromagnetic signal parameter determined at the first time ($t_0$). The one or more electromagnetic signal parameters determined at the first time ($t_0$) are used to adjust the emission of one or more first electromagnetic signals 1210 (e.g., strobes, flashes, lasers, patterns, ultraviolet light, etc.) at the second time ($t_1$). In some embodiments, the second verification images 1204 are captured while the one or more first electromagnetic signals 1210 are emitted at document 300. For example, in some embodiments, the one or more first electromagnetic signals 1210 are a first flash with first flash characteristics (e.g., an intensity and/or duration). The second verification images 1204 are captured via cameras 218 while the one or more first electromagnetic signals 1210 are emitted towards document 300. Similarly, data corresponding to the second verification images and the electromagnetic signal parameters determined at the second time ($t_1$) are stored as described in FIG. 12A. For example, the stored data may include the one or more signal electromagnetic parameters determined at the second time ($t_1$) for the one or more first electromagnetic signals 1210.

In some embodiments, the one or more first electromagnetic signals 1210 emitted towards document 300 expose or make detectable one or more security features of the document 300. Additionally or alternatively, in some embodiments, the one or more first electromagnetic signals 1210 emitted towards document 300 obscure or conceal other security features of the document 300. For example, the one or more first electromagnetic signals 1210 emitted towards document 300 allow for hologram 310 to be detected or captured in the second verification images 1204 while at the same time obscuring or concealing scratch 308 or text 312 such that it is not captured or detected in the second verification images 1204.

As described above, the second verification images 1204 (e.g., obtained while the one or more first electromagnetic signals 1210 are emitted towards document 300) are analyzed to determine whether the detected or captured security features of the document 300 meet security criteria. For example, second verification images 1204 are analyzed to determine whether detected or captured hologram 310 meets the security criteria. Additionally or alternatively, in some embodiments, the second verification images 1204 are analyzed to determine whether the obscured or concealed security features of the document 300 meet security criteria. For example, if the one or more first electromagnetic signals 1210 are expected to conceal or obscure scratch 308 or text 312, the second verification images 1204 are analyzed to determine whether scratch 308 meets the security criteria (e.g., scratch 308 or text 312 are concealed or obscured). Based on a determination that the security features meet the security criteria, document 300 is authenticated.

In some embodiments, security criteria is met when one or more security signals meets predetermined characteristics and/or patterns. Alternatively and/or additionally, in some embodiments, security criteria is met by comparing the one or more security features with stored security features. Optionally, in some embodiments, the first verification images 1202 and the second verification images 1204 are compared to determine if the security criteria is met (e.g., determining consistency between images and/or document 300, determining consistency between security features in the images, analyzing detected patterns or characteristics of respective security features, etc.). For example, the one or more first electromagnetic signals 1210 allow for the detection or capture of hologram 310 in the second verification images 1204, the second verification images 1204 are compared to the first verification images 1202 to determine whether hologram 310 is detected or captured in the second verification image 1204 and not detected or captured in the first verification images 1202 (e.g., hologram 310 is visible when exposed to the first electromagnetic signals 1210 and absent when not exposed to any electromagnetic signals).

FIG. 12C illustrates emitting second electromagnetic signals at document 300 in accordance with some embodiments. In some embodiments, one or more electromagnetic signal parameters are adjusted using the information that corresponds to the third location of the document 300 at the third time ($t_2$). In some embodiments, the electromagnetic signal parameters determined at the third time ($t_2$) are the same as the electromagnetic signal parameter determined at the second time ($t_1$) and/or the first time ($t_0$). In some embodiments, the electromagnetic signal parameters determined at the third time ($t_2$) are distinct from the electromagnetic signal parameter determined at the second time ($t_1$) and/or the first time ($t_0$). The one or more electromagnetic signal parameters determined at the third time ($t_2$) are used to adjust the emission of one or more second electromagnetic signals 1220 at the third time ($t_2$). The third verification images 1206 are captured while the second electromagnetic signals 1220 are emitted towards document 300.

In some embodiments, based on the respective electromagnetic signal parameters, the first and second electromagnetic signals are emitted from distinct electromagnetic emitters 220. For example, in some embodiments, the first electromagnetic signals 1210 are a flash from a first electromagnetic emitter with determined flash characteristics (e.g., an intensity and/or duration) and the second electromagnetic signals 1220 comprise UV light from a second electromagnetic emitter with UV light characteristics. Additionally or alternatively, in some embodiments, based on the respective electromagnetic signal parameters, the first and second electromagnetic signals are emitted from the same electromagnetic emitters 220 and emit either different signal types, the same signal type with different characteristics, and/or different signal types with similar characteristics. For example, in some embodiments, the first electromagnetic signals 1210 are a flash from a first electromagnetic emitter with determined first flash characteristics and the second electromagnetic signals 1220 are a strobe light from the first electromagnetic emitter with strobe light characteristics. In other embodiments, the first electromagnetic signals 1210 may be a flash from a first electromagnetic emitter with determined first flash characteristics and the second electromagnetic signals 1220 may be a flash from the first electromagnetic emitter with second flash characteristics (e.g., higher intensity, longer duration, higher frequency, etc.). Different combinations of the electromagnetic signal emitters and electromagnetic signal parameters may be used to authenticate a document based on the security features.

In some embodiments, the second electromagnetic signals 1220 allow for the capture or detection of one or more security features while obscuring and/or concealing other security features (as described in FIG. 12B). For example, the second electromagnetic signals 1220 allow for the capture and/or detection of text 312 in the third verification images 1206 while at the same time obscuring and/or concealing perforations 306 (e.g., perforations 306 are not captured or detected in the third verification images 1206). As described above in FIGS. 12A and 12B, data corresponding to the third verification images and the electromagnetic signal parameters determined at the third time ($t_2$) are stored. As described above, the third verification images 1206 (e.g., obtained while the second electromagnetic signals 1220 were emitted towards document 300) are analyzed to determine whether the detected or captured security features of the document 300 meet security criteria. In some embodiments, the first verification image 1202, second verification image 1204, and/or third verification image 1206 are compared to determine whether the security features meet the security criteria (e.g., determining consistency between images, determining consistency between security features, analyzing detected patterns or characteristics of respective security features, etc.).

Figure 13A:
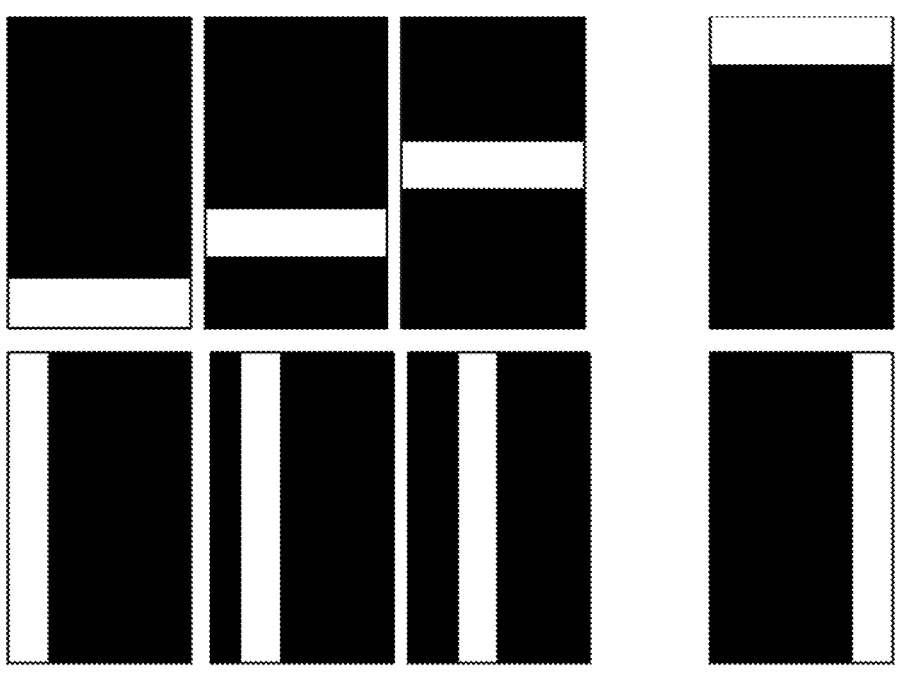
FIGS. 13A-13B illustrate emitted electromagnetic signal patterns, in accordance with some embodiments.
Figure 13B:
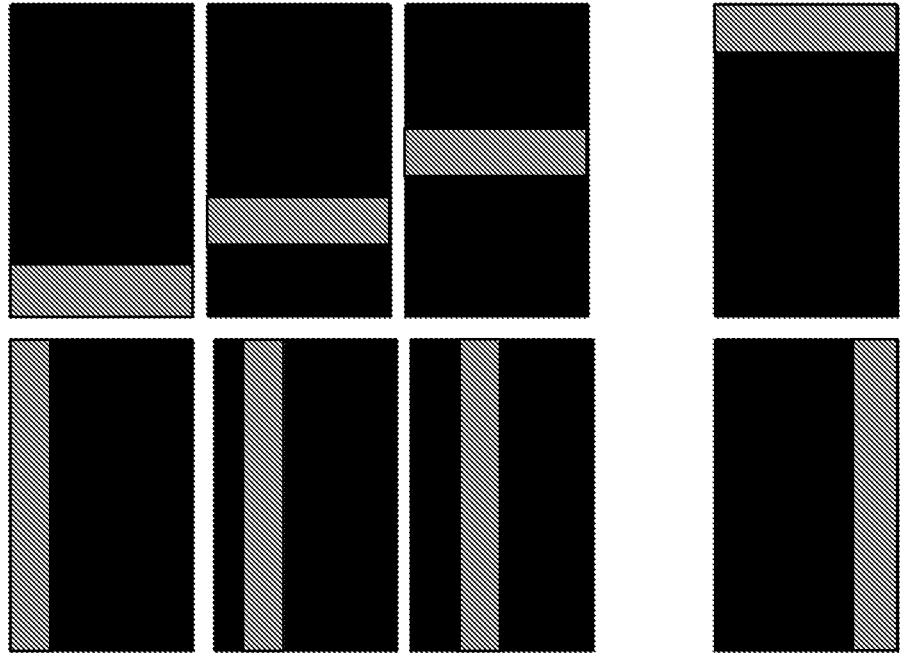

FIG. 13A and FIG. 13B illustrate emitted electromagnetic signals patterns in accordance with some embodiments. FIG. 13A illustrates exemplary configurations for one or more patterns emitted from an electromagnetic emitter 220 such as a display. The one or more patterns include a first color and/or set of colors, a first size, a first intensity, a first motion rate, and/or a first location (consistent with the patterns in FIG. 13A). FIG. 13B illustrates additional exemplary configuration for one or more patterns including a second color and/or set of colors, a second size, a second intensity, a second motion rate, and/or a second location (consistent with the patterns in FIG. 13B).

In some embodiments, the one or more electromagnetic signal emitters 220 include a first display of user device 200 (e.g. using the first display as a light source). In some embodiments, the one or more first electromagnetic signals are a first displayed pattern (e.g., an image and/or animation consistent with FIG. 13A) on the first display. In some embodiments, the one or more first electromagnetic signals are configured to allow for the detection or capture of a security feature from a first angle. For example, the first displayed patterns emitted from a light source (e.g. a display of user device 200) may allow for the detection or capture of hologram 310 via a camera 218 (e.g., front facing or selfie camera) when the light source is located to the left of hologram 310. As described above, the determined location of document 300 with respect to the user device 200 is used to determine the one or more electromagnetic parameters, including the one or more patterns emitted from an electromagnetic emitter 220, of the emitted electromagnetic signals.

Alternatively and or additionally, in some embodiments, one or more second electromagnetic signals are a second displayed pattern (e.g., an image and/or animation consistent with FIG. 13B) on the first display. In some embodiments, the one or more second electromagnetic signals are configured to allow for the detection or capture of a security feature from a second angle. In some embodiments, the second angle is distinct from the first angle. For example, the one or more second electromagnetic signals may be second displayed patterns emitted by a light source (e.g., a display of user device 200) that allows for the capture or detection of hologram 310 via a camera 218 (e.g., front facing or selfie camera) when the light source is located to the right of hologram 310. In some embodiments, the second displayed patterns are configured to allow for the detection or capture of a second security feature distinct from a first security feature, the first security feature detected or captured while the first displayed patterns are emitted towards document 300. As described above, the determined location of document 300 with respect to the user device 200 is used to determine the one or more electromagnetic parameters, including the one or more patterns emitted from an electromagnetic emitter 220, of the emitted electromagnetic signals.

Optionally, in some embodiments, the one or more electronic signal emitters 220 include a second display of user device 200 and the second display of user device 200 is used as a light source. In some embodiments, the second display is integrated into user device 200 (e.g., a second display distinct from the first display, where both are part of a single user device 200) and/or part of a smart cover for user device 200. In some embodiments, the second display may be located on any side of user device 200 (e.g., attachable displays). In some embodiments, the second display of user device 200 is opposite the first display. For example, the first display may be located on the same side as the front facing camera and the second display may be located on the same side as the rear facing camera. In some embodiments, the first display is located on a first portion of a clamshell device (e.g., a flip open and/or close user device 200) and the second display is located on a second portion of the clamshell device.

In some embodiments, based on the determined electromagnetic signal parameters, the electromagnetic signals emitted by the second display of user device 200 are the same as the electromagnetic signals emitted by the first display of user device 200. Additionally or alternatively, in some embodiments, electromagnetic signals emitted by the second display of user device 200 are distinct from the electromagnetic signals emitted by the first display of user device 200 (e.g., determined electromagnetic signal parameters). The second display operates as a second electromagnetic signal emitter and may be adjusted, via the electromagnetic signal parameters, as needed to allow for the detection or capture of security features of document 300 via camera 218.

In some embodiments, user device 200 requests or prompts user 402 to place document 300 a predetermined distance (e.g. 2 cm, 5 cm, 10 cm, etc.) in front of the first and/or second display. While the document 300 is the predetermined distance in front of the first and/or second display, a camera 218 of the user device 200 (e.g., a selfie camera) captures images of document 300 as electromagnetic signals corresponding to determined electromagnetic signal parameters are emitted from the first display towards the document 300. In some embodiments, the one or more electromagnetic signal parameters include the one or more patterns described and shown in FIGS. 13A and 13B. For example, the one or more electromagnetic signals of the first display will display one or more static images and or animations corresponding to the patterns shown in FIGS. 13A and/or 13B, and the one or more security features detected while the one or more electromagnetic signals of the first display are emitted are captured in one or more images to be analyzed. In accordance with a determination that the one or more detected or captured security features meet the security criteria, document 300 is authenticated.

Figure 14A:
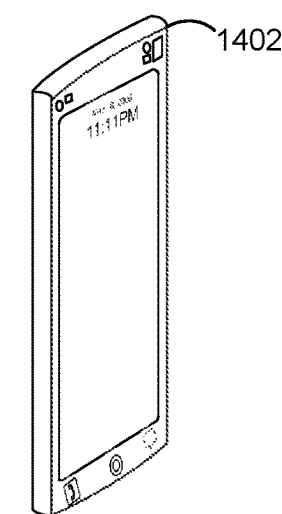
FIGS. 14A-14C illustrate a device with flexible display properties, in accordance with some embodiments.
Figure 14B:
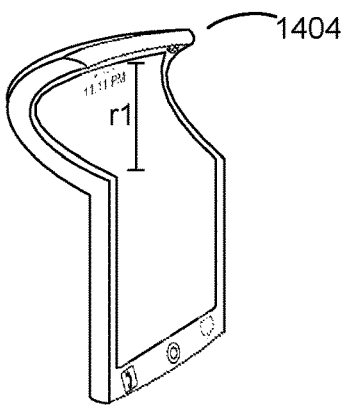
Figure 14C:
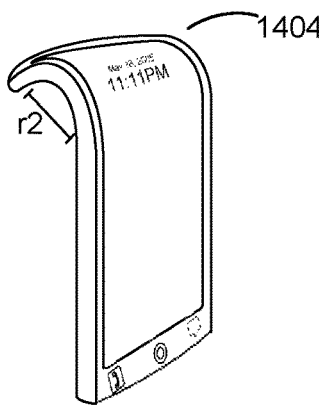

FIGS. 14A-14C illustrate user device 200 with device configurations 1400. In some embodiments, user device 200 includes a flexible display. In some embodiments, device configurations includes a flexed position of user device 200. FIG. 14A shows user device 200 in a first device configuration. In some embodiments, the first device configuration includes user device 200 with a flat display 1402 (e.g., unfolded or non-flexed position). In some embodiments, the one or more electromagnetic parameters of the one or more electromagnetic signals are determined via the first location of document 300 and the first device configuration. In some embodiments, the one or more electromagnetic parameters are determine as discussed above in FIGS. 6A-12C.

FIG. 14B shows user device 200 in a second device configuration. In some embodiments, the second device configuration includes user device 200 with a first bend radius display 1404. In some embodiments, the one or more electromagnetic parameters of the one or more electromagnetic signals are determined via the first location of document 300 and the second device configuration (e.g., the first bend radius, r1). The one or more electromagnetic parameters are determine as discussed above in FIGS. 6A-12C.

FIG. 14C shows user device 200 in a third device configuration. In some embodiments, the third device configuration includes user device 200 with a second bend radius display 1406. In some embodiments, the one or more electromagnetic parameters of the one or more electromagnetic signals are determined via the first location of document 300 and the third device configuration (e.g., the second bend radius, r2). In some embodiments, the second bend radius is distinct from the first bend radius. The one or more electromagnetic parameters are determine as discussed above in FIGS. 6A-12C. In some embodiments, respective verification images (e.g., first verification image 602 and second verification image 652) are captured while a user device 200 with a flexible display has a first bend radius, and the second verification image has a second bend radius that is the same or distinct from the first bend radius.

FIGS. 15A-15E are flow diagrams illustrating a method 1500 for authenticating a document using one or more electromagnetic signals, in accordance with some embodiments. The method 1500 is performed at a device, such as a computing system 100, a user device 200, or a combination thereof. For example, instructions for performing the method 1500 are stored in the memory 102 and executed by the processor(s) 130 of the computing system 100. Similarly, instructions for performing the method 1500 may be stored in the memory 202 and executed by the processor(s) 224 of the user device 200. In FIGS. 15A-15C, dotted outlines indicate optional operations.

The device 100 receives (1502) image data that includes a document 300. In some embodiments, the image data is a video, sequence of images, and/or a still image as discussed above. The document may be a passport, a driver's license, faculty card, security card, and/or other examples described above in FIG. 3. Device 100 receives (1504) data from one or more sensors as described above in in FIGS. 6A-12C. The one or more sensors are described above in FIG. 2. For example, in some embodiments, the one or more sensors include (1506) a depth sensor that determines a distance between the depth sensor and the document 300, the distance between the depth sensor and the document 300 is included in the data received (1504) from the one or more sensors. Any sensor or combination of sensors 222 of user device 200 may be used to determine the location of document 300. Additional examples of sensors are provided above in FIGS. 6A-12C.

The device 100 determines (1508) a first location of the document 300 using the data received from the one or more sensors and the received image data. For example as describe in FIGS. 6A-12C, the location of document 300 is determined relative to user device 200. A position of document 300 in space may be used to determine the location of document 300; the location of document 300 may be determined based on a distance between document 300 and user device 200; the location of document 300 may be determined based on the device configuration (e.g., FIGS. 14A-14C); and/or other exampled described herein. In some embodiments, determining the first location of the document 300 includes capturing (1510-a) one or more location determination images of the document 300 via one or more cameras 218; determining (1510-b) a respective position of the document 300 in the one or more location determination images; and, based on the respective position of the document 300 in the one or more location determination images, determining (1510-c) the first location of the document 300 as described above in FIGS. 6A-12C.

Device 100 determines (1512) first electromagnetic signal parameters using at least the determined first location of the document 300. In some embodiments, device 100 receives (1514-a) device information corresponding to an electronic device (e.g. user device 200) associated with the device 100. In some embodiments, the device information includes a bend radius that corresponds a configuration of the electronic device relative to the determined first location of the document (e.g. as described in FIGS. 14A-14C). In some embodiments, device 100 determines (1514-b) the first electromagnetic signal parameters using the received device information and the determined first location of the document 300.

In some embodiments, prior to emitting electromagnetic signals, device 100 determines (1516-a) whether the determined first location of the document meets capture criteria. In accordance with a determination that the determined first location of the document does not meet the capture criteria, device 100 prompts (1516-b) a user to adjust the document 300. For example, as shown in FIGS. 6A-12C, verification images are captured when different capture criteria are satisfied. Device 100 emits (1518), using one or more electromagnetic signal emitters, a first electromagnetic signal at the document 300. The first electromagnetic signal is based on the determined first electromagnetic signal parameters. For example, as in FIGS. 12A-12C, the location of document 300 at different times is used to determine respective electromagnetic signal parameters that are used to emit corresponding electromagnetic signals.

While emitting the first electromagnetic signal at the document 300, device 100 captures (1520), via one or more cameras 218, a first verification image of the document. The first verification image includes security features that are exposed to the first electromagnetic signal. Security features exposed to one or more electromagnetic signals, as used herein, refers to security features captured in document 300 as electromagnetic signals are emitted at document 300 whether or not the security features are detected or visible. For example, as described in FIGS. 12A-12C, one or more verification images are captured at different times while one or more respective electromagnetic signals, corresponding to a respective time, are emitted at document 300.

Device 100 determines (1522) whether a first security feature of the security features in the first verification image meets security criteria. For example, security criteria includes one or more predetermined characteristics and/or patterns for respective security features. In some embodiments, determining whether the first security feature meets the security criteria includes comparing (1524) at least one of characteristics or patterns of the first security feature with characteristics or patterns of a respective stored security feature. In some embodiments, the security criteria is met when the captured characteristics and/or patterns of the one or more security features in a verification image match the corresponding predetermined characteristics and/or patterns stored in document database 110 (or locally on a user device 200) or the captured characteristics and/or patterns of the one or more security features in the verification image are consistent between images. Predetermined characteristics and/or patterns for respective security features are described in FIG. 3 (e.g., additional examples provided in 6A-12C). In some embodiments, the security criteria is met when the captured characteristics and/or patterns of the one or more security features in a first verification image match the corresponding predetermined characteristics and/or patterns in a second verification image (as described herein).

In accordance with a determination that the first security feature of the security features meets the security criteria, device 100 provides (1526) authentication information. The authentication information is provided to user 402 and/or a remote third party 160 (e.g., to complete authentication and/or a transaction). Alternatively or additionally, in some embodiments, in accordance with a determination that the first security feature of the security features does not meet the security criteria, device 100 provides (1528) invalidation information. In some embodiments, the invalidation information prompts or request user 402 to provide a new image of document 300, use a different document, or terminates the authentication process.

In some embodiments, after capturing the first verification image of the document, device 100 determines (1530-*a*) a second location of the document and determines (1530-*b*) second electromagnetic signal parameters using at least the determined second location of the document (as described above). In some embodiments, device 100 emits (1530-*c*) a second electromagnetic signal at the document 300. The second electromagnetic signal is based on the determined second electromagnetic signal parameters. In some embodiments, while emitting the second electromagnetic signal at the document 300, device 100 captures (1530-*d*) a second verification image of the document. The second verification image includes additional security features that are exposed to the second electromagnetic signal. In some embodiments, device 100 determines (1530-*e*) whether a second security feature of the additional security features in the second verification image meets security criteria; and, in accordance with a determination that the second security feature of the additional security features meets the security criteria, provides (1530-*f*) authentication information.

In some embodiments, the determined (1532) first location and the determined second location of the document are the same and the determined second electromagnetic signal parameters are distinct from the first electromagnetic signal parameters. For example, as described above in FIGS. 12A-12C, different electromagnetic emitters may be used to emit signals at the document 300, different characteristic of the electromagnetic signals may be adjusted (e.g., intensity, duration, frequency, etc.), and/or other variations described herein may be adjusted even if the location of document 300 has not changed.

In some embodiments, the determined (1534) second location of the document is distinct from the determined first location of the document. The first and second electromagnetic signals emitted at document 300 may be the same or distinct. In some embodiments, the one or more electromagnetic signals emitted are based on the desired security features that are to be compared. For example, if a concealed UV image of document 300 is to be compared, device 100 emits a UV light and or other electromagnetic signals to capture and/or detect the security feature in the verification images. In some embodiments, the first security feature and the second security feature are the same (1536). For example, the first security feature may be hologram 310 captured while the first electromagnetic signal is emitted at the document and the second security feature may also be hologram 310 captured while the second electromagnetic signal is emitted at the document. Alternatively or additionally, in some embodiments, the first security feature and the second security feature are distinct. In some embodiments, the additional security features of the second verification image may include the same security features captured in the first verification, include new security features that were not captured in the first verification image, and/or not show security features captured in the first verification (e.g., one or more security features in the first verification image are not detected and/or captured in the second verification image).

In some embodiments, the security criteria includes comparing (1538) at least one of characteristics or patterns of the first security feature with characteristics or patterns of the second security feature. For example, if the first security and the second feature are a hologram 310, the first and second security features are compared. In another example, if the first security and the second feature are distinct (e.g., a hologram 310 and a UV image), the first and second security features are compared to determine consistency (e.g., UV image not present when the electromagnetic signal is not a UV light). As described above in FIGS. 6A-12C, verification images may be compared to determine consistency between the security features, the capture or detection of security feature when electromagnetic signals are emitted at document 300 may be compared, and/or concealed or obscured security features may be used to authenticate the document 300.

In some embodiments, device 100 captures (1540) the first verification image using a first camera and the second verification image using a second camera that is distinct from the first camera. For example, the first verification image may be captured with an ultra-wide angle lens camera and the second verification image may be captured by a telephoto camera. Alternatively, in some embodiments, device 100 captures the first verification image and the second verification image using the same camera.

In some embodiments, the first electromagnetic signal is a first displayed image and the second electromagnetic signal is a second displayed image that is distinct from the first displayed image (1542). For example, as described in FIGS. 13A and 13B, the first and second displayed images may be different patterns, different colors, different sizes, etc. In some embodiments, the first displayed image includes (1544) a first pattern configured to expose a first security feature from a first angle and the second displayed image includes a second pattern configured to expose the first security feature from a second angle. For instance, as described in FIGS. 13A and 13B, a first pattern may allow for a security feature of document 300 to be captured or detected when placed to the left of document 300 and a second pattern may allow for the same or a different security feature of document 300 to be captured or detected when placed to the right of document 300, or vice versa.

In some embodiments, the first electromagnetic signal is a first flash with a first flash characteristic and the second electromagnetic signal is a second flash with a second flash characteristic that is distinct from the first characteristic (1546). Alternatively or additionally, in some embodiments, the first electromagnetic signal is a first set of one or more lasers with a first laser characteristic and the second electromagnetic signal is a second set of one or more lasers with a second laser characteristic that is distinct from the first characteristic (1548). Different electromagnetic signal parameters may be used for the emitted electromagnetic signals. The electromagnetic signal parameters may device characteristics for the emitted signals such as a pattern, a frequency, an intensity, etc. as described above in FIG. 2. The electromagnetic signal parameters may also identify a signal type and/or source. For instance, the electromagnetic parameters may identify the use of a laser, auto focus laser, or other lasers disclosed herein and corresponding parameters for an electromagnetic signal that is emitted at document 300.

In some embodiments, the first electromagnetic signal is emitted (1550) using a first electromagnetic signal emitter and the second electromagnetic signal is emitted using a second electromagnetic signal emitter that is distinct from the first electromagnetic signal emitter. In some embodiments, the electromagnetic signal parameters are determined, in part, by the security feature that is to be detected, the electromagnetic signal parameters identifying the electromagnetic signal emitter to be used. For example, the electromagnetic signal parameters may identify the use of a UV light to detect and/or capture a UV image, higher intensity flash to locate or detect scratches 308, a strobe to determine consistency between images, etc. In some embodiments, the first electromagnetic signal emitter is a first display and the second electromagnetic signal emitter is a second display that is distinct from the first display (1552). For example, as described in FIGS. 13A and 13B, one or more displays of user device 200 may be used as a light engine to emit electromagnetic signals at document 300. In some embodiments, the first electromagnetic signal emitter has a first signal source type and the second electromagnetic signal emitter has a second signal source type that is distinct from the first signal source type (1554). For example, as described above, in some embodiments, a first emitter may be an LED and the second emitter is a display of the user device; the first emitter may be a laser and the second emitter is a UV light; the first emitter may be a projector (e.g., attached to the user device 200 or a kiosk 200*b*) and the second emitter is a strobe light; and/or any other the combination source type (e.g. type of emitter) described in FIG. 2.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 102 and the memory 202) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 102 and the memory 202 include one or more storage devices remotely located from the CPU(s) 130 and 224. The memory 102 and the memory 202, or alternatively the non-volatile memory device(s) within these memories, comprises a non-transitory computer readable storage medium.

Communication systems as referred to herein (e.g., the communication system 180 and the communication system 260) optionally communicate via wired and/or wireless communication connections. Communication systems optionally communicate with networks (e.g., the network 150), such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A computer-implemented method, comprising:
at a system including one or more processors and memory storing one or more programs for execution by the one or more processors:
receiving image data that includes a document;
receiving data from one or more sensors;
determining a first location of the document using the data received from the one or more sensors and the image data;
determining first electromagnetic signal parameters using at least the first location of the document;
emitting, using one or more electromagnetic signal emitters, a first electromagnetic signal at the document, wherein the first electromagnetic signal is based on the first electromagnetic signal parameters;
while emitting the first electromagnetic signal at the document, capturing, via one or more cameras, a first verification image of the document, wherein the first verification image includes security features that are exposed to the first electromagnetic signal;
determining whether a first security feature of the security features in the first verification image meets security criteria;
in accordance with a determination that the first security feature of the security features meets the security criteria, providing authentication information; and
receiving device information corresponding to an electronic device associated with the system, wherein the device information includes a bend radius that corresponds to a configuration of the electronic device relative to the first location of the document; and device information.

2. The method of claim 1, further comprising in accordance with a determination that the first security feature of the security features does not meet the security criteria, providing invalidation information.

3. The method of claim 1, wherein determining the first location of the document includes:
capturing one or more location determination images of the document;
determining a respective position of the document in the one or more location determination images; and
based on the respective position of the document in the one or more location determination images, determining the first location of the document.

4. The method of claim 1, wherein the one or more sensors include a depth sensor that determines a distance between the depth sensor and the document, the distance between the depth sensor and the document included in the data received from the one or more sensors.

5. The method of claim 1, further comprising:
after capturing the first verification image of the document, determining a second location of the document;
determining second electromagnetic signal parameters using at least the second location of the document;
emitting a second electromagnetic signal at the document, wherein the second electromagnetic signal is based on the second electromagnetic signal parameters;
while emitting the second electromagnetic signal at the document, capturing a second verification image of the document, wherein the second verification image includes additional security features that are exposed to the second electromagnetic signal;
determining whether a second security feature of the additional security features in the second verification image meets second security criteria; and
in accordance with a determination that the second security feature of the additional security features meets the second security criteria, providing the authentication information.

6. The method of claim 5, wherein the first location and the second location of the document are the same and the second electromagnetic signal parameters are distinct from the first electromagnetic signal parameters.

7. The method of claim 5, wherein the second location of the document is distinct from the first location of the document.

8. The method of claim 5, wherein the first verification image is captured by a first camera and the second verification image is captured by a second camera that is distinct from the first camera.

9. The method of claim 5, wherein the first electromagnetic signal is a first displayed image and the second electromagnetic signal is a second displayed image that is distinct from the first displayed image.

10. The method of claim 9, wherein the first displayed image includes a first pattern configured to expose the first security feature from a first angle and the second displayed image includes a second pattern configured to expose the first security feature from a second angle.

11. The method of claim 5, wherein the first electromagnetic signal is a first flash with first flash characteristics and the second electromagnetic signal is a second flash with second flash characteristics that are distinct from the first flash characteristics.

12. The method of claim 5, wherein the first electromagnetic signal is produced by a first set of one or more lasers with a first laser characteristic and the second electromagnetic signal is produced by a second set of one or more lasers with a second laser characteristic that is distinct from the first laser characteristic.

13. The method of claim 5, wherein the first electromagnetic signal is emitted using a first electromagnetic signal emitter and the second electromagnetic signal is emitted using a second electromagnetic signal emitter that is distinct from the first electromagnetic signal emitter.

14. The method of claim 13, wherein the first electromagnetic signal emitter is a first display and the second electromagnetic signal emitter is a second display that is distinct from the first display.

15. The method of claim 1, further comprising:
determining initial document information including a location, visibility and orientation of the document.

16. The method of claim 1, wherein the security criteria include a comparison of at least one of characteristics or patterns of the first security feature with characteristics or patterns of a respective stored security feature.

17. The method of claim 5, wherein the first security feature and the second security feature are the same.

18. The method of claim 17, wherein the security criteria includes a comparison of at least one of characteristics or patterns of the first security feature with characteristics or patterns of the second security feature.

19. A system, comprising:
one or more processors; and
memory coupled to the one or more processors, the memory storing one or more programs configured to be executed by the one or more processors, the one or more programs including instructions for performing a set of operations, including:
receiving image data that includes a document and data from one or more sensors;
determining a first location of the document using the data received from the one or more sensors and the image data received;
determining first electromagnetic signal parameters using at least the first location of the document and emitting, using one or more electromagnetic signal emitters, a first electromagnetic signal at the document, wherein the first electromagnetic signal is based on the first electromagnetic signal parameters;
while emitting the first electromagnetic signal at the document, capturing, via one or more cameras, a first verification image of the document, wherein the first verification image includes security features that are exposed to the first electromagnetic signal;
determining whether a first security feature of the security features in the first verification image meets security criteria and in accordance with a determination that the first security feature of the security features meets the security criteria, providing authentication information;

receiving device information corresponding to an electronic device associated with the system, wherein the device information includes a bend radius that corresponds to a configuration of the electronic device relative to the first location of the document; and
determining first electromagnetic signal parameters includes using the device information.

20. A non-transitory computer-readable storage medium storing one or more programs, the one or more programs comprising instructions, which when executed by a computing system, cause the computing system to perform a set of operations, including:
receiving image data that includes a document and data from one or more sensors;
determining a first location of the document using the data received from the one or more sensors and the image data received;
determining first electromagnetic signal parameters using at least the first location of the document and emitting, using one or more electromagnetic signal emitters, a first electromagnetic signal at the document, wherein the first electromagnetic signal is based on the first electromagnetic signal parameters;
while emitting the first electromagnetic signal at the document, capturing, via one or more cameras, a first verification image of the document, wherein the first verification image includes security features that are exposed to the first electromagnetic signal;
determining whether a first security feature of the security features in the first verification image meets security criteria and in accordance with a determination that the first security feature of the security features meets the security criteria, providing authentication information;
after capturing the first verification image of the document, determining a second location of the document and second electromagnetic signal parameters using at least the second location of the document determined;
emitting a second electromagnetic signal at the document, wherein the second electromagnetic signal is based on the second electromagnetic signal parameters and while emitting the second electromagnetic signal at the document, capturing a second verification image of the document, wherein the second verification image includes additional security features that are exposed to the second electromagnetic signal; and
determining whether a second security feature of the additional security features in the second verification image meets second security criteria and in accordance with a determination that the second security feature of the additional security features meets the second security criteria, providing the authentication information.

* * * * *